United States Patent [19]

Bent et al.

[11] Patent Number: 4,543,580
[45] Date of Patent: Sep. 24, 1985

[54] SYSTEM FOR LIGHTNING GROUND STROKE POSITION BY TIME OF ARRIVAL DISCRIMINATION

[75] Inventors: Rodney B. Bent, Indialantic; Paul W. Casper, West Melbourne, both of Fla.

[73] Assignee: Atlantic Scientific Corporation, Melbourne, Fla.

[21] Appl. No.: 339,789

[22] Filed: Jan. 15, 1982

[51] Int. Cl.⁴ .......................... G01S 1/44; G01S 1/24
[52] U.S. Cl. ..................................... 343/460; 343/388
[58] Field of Search ............... 343/388, 389, 451, 460, 343/465, 450; 364/452

[56] References Cited

U.S. PATENT DOCUMENTS

| | | | |
|---|---|---|---|
| 1,759,938 | 5/1930 | Dean | 343/450 |
| 2,402,688 | 6/1946 | Skurnick | 343/460 X |
| 2,864,081 | 12/1958 | Steelman | 343/460 |
| 3,369,240 | 2/1968 | Leary | 343/460 |
| 3,375,520 | 3/1968 | DeGroot et al. | 343/389 |
| 3,732,556 | 5/1973 | Caprillo et al. | 340/620 X |
| 3,750,178 | 6/1973 | Hulst | 343/465 |
| 3,754,263 | 8/1973 | Wojtasinski | 343/460 |
| 3,886,553 | 5/1975 | Bates | 343/465 |
| 3,940,700 | 2/1976 | Fischer | 343/465 |
| 4,138,660 | 2/1979 | Hill | 343/460 X |

Primary Examiner—Theodore M. Blum
Assistant Examiner—Brian S. Steinberger
Attorney, Agent, or Firm—Antonelli, Terry & Wands

[57] ABSTRACT

A lightning ground stroke location system employs a time-of-arrival discrimination scheme which uses, as its time synchronization base, the U.S. Coast Guard LORAN-C navigation network. The system comprises a plurality (at least three and preferably four) of geographically separated lightning stroke monitoring stations. Each station contains a lightning stroke detector and a timing signal generator that is synchronized with the timing signal generator at each other respective detection location. The timing signal generation equipment at each receiver is comprised of a LORAN-C signalling responsive receiver which monitors the same encoded signal group emitted from a common LORAN-C reverence source. Each of the ground stroke detection stations is further connected via a respective communication link to a central processing facility.

When a ground stroke occurs, the electromagnetic pulse emitted is detected by each listening station, which records the time of detection of the ground stroke by sampling an internal synchronized clock at that particular station so as to record the time that the stroke was detected relative to the standard timing cycle is emitted by the reference Coast Guard station source. This time data is then transmitted to the central processing station, which after compensating for relative LORAN time signal propagation delay calculates the stroke location.

30 Claims, 14 Drawing Figures

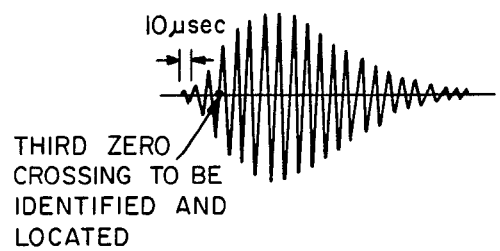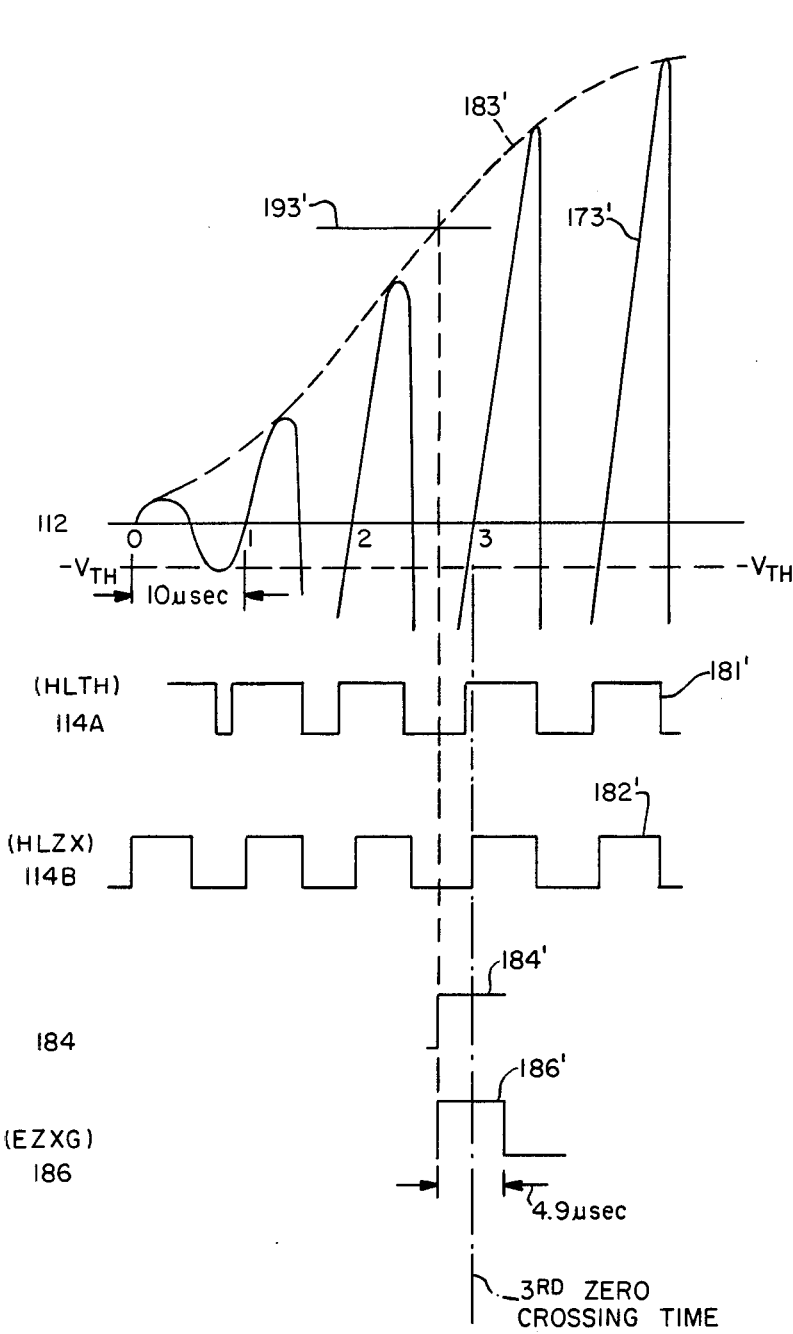

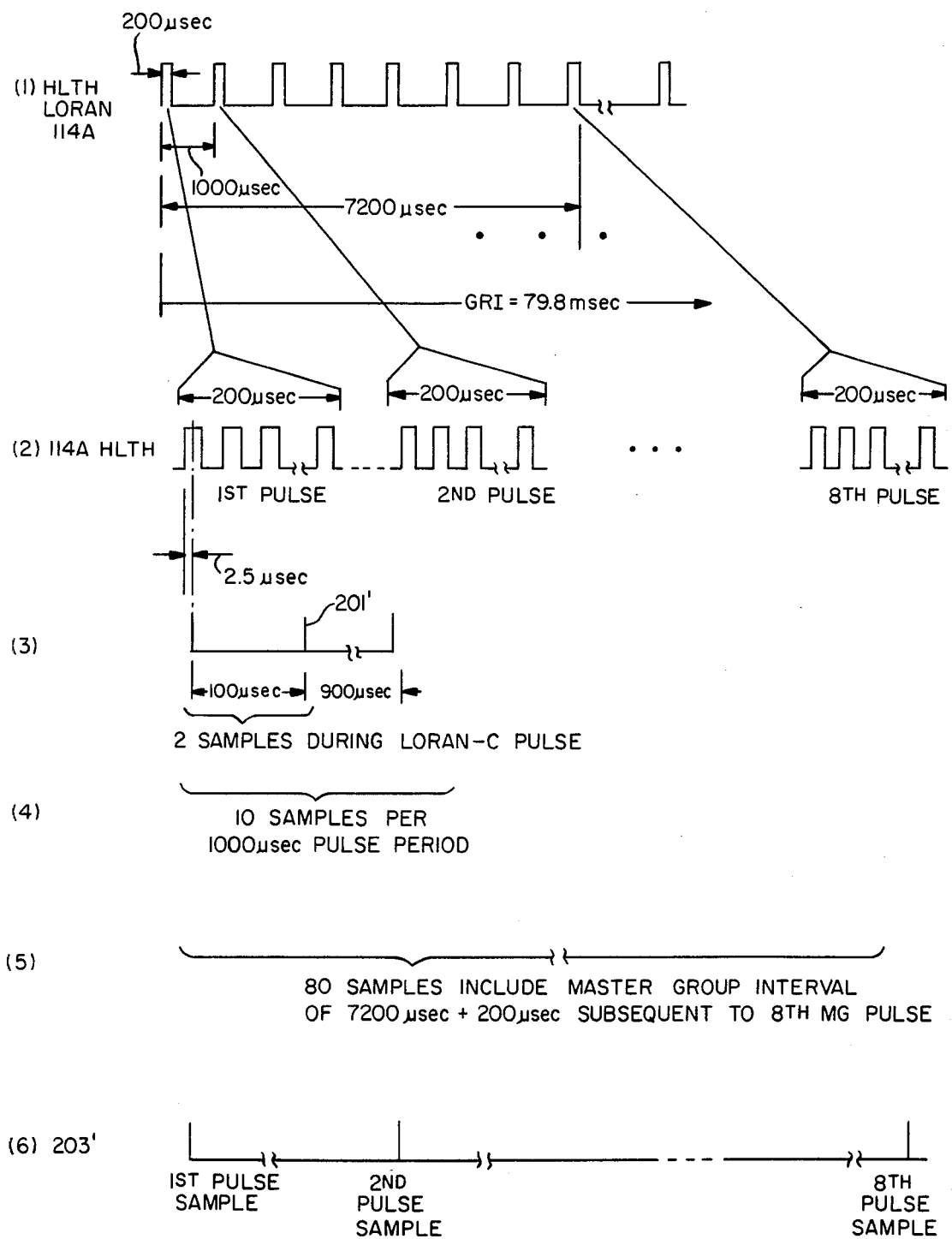

GROUND STROKE RECEIVER BLOCK DIAGRAM

SYSTEM FOR LIGHTNING GROUND STROKE POSITION BY TIME OF ARRIVAL DISCRIMINATION

FIELD OF THE INVENTION

The present invention relates in general to lightning detection systems and, more particularly, to a system for accurately determining the position of a lightning discharge to ground.

BACKGROUND OF THE INVENTION

Storm warning systems, particularly those which monitor the electrical discharge activity attendant to the storms, employ various types of direction finding and/or range finding equipment. Typically, the systems are designed to be responsive to the characteristics of the lightning stroke and to generate an indication of the occurrence of a stroke and the direction or position from which the stroke originated. Examples of such systems which seek to provide position information may be found in U.S. Pat. Nos. 4,115,732 and 4,245,190 to Krider et al; 4,023,408 to Ryan et al; 3,369,240 to Leary; 3,754,263 to Wojtasinski et al; 2,684,474 to Kass; and 3,886,553 to Bates.

Other types of systems seek principally to determine the direction or bearing of the discharge. Examples of these types of systems may be found in the U.S. Pat. Nos. 1,759,938 to Dean; 3,603,951 to Bracken et al; 4,236,159 to Alpers; 4,210,913 to Newhouse et al; and 4,198,599 to Krider et al.

Within such systems and other configurations for detecting impending storms or determining the occurrence of lightning strokes, there are various subsystems which are principally lightning detectors. Examples of such detectors may be found in U.S. Pat. Nos. 3,891,919 to Penninger; 3,753,117 to Downing et al; 4,095,221 to Slocum; and 3,790,884 to Cohl.

For the most part, the systems described in the above literature provide either simply a warning or an indication of direction of the storm. Where an attempt is made to provide position information, the system operates to provide only a gross or coarse approximation of the position of occurrence of the lightning discharge.

With currently increasing population densities and complex air traffic patterns, particularly in the very regions of increasing population density, the need for highly accurate storm warning capability has become paramount. This is especially true with respect to thunderstorm activity wherein there is a need to provide a warning for a number of diverse interests. These include advance warning information to flying aircraft of storm situations and intensities, the alerting of aircraft refueling crews of possible damage, enabling protective measures to be taken in industries handling toxic and particularly cryogenic materials, alerting power companies, locating possible forest fires that may be generated by lightning, and protecting personnel in open areas, such as golf courses, marinas, etc.

SUMMARY OF THE INVENTION

To answer this need, applicants have developed the present invention which offers a technique for locating the position of a lightning ground stroke with a high degree of accuracy, as opposed to coarse approximation systems of the prior art, without the need for the manufacture of a total package of specialized equipment for the purpose. In addition to the above-referenced U.S. patents, examples of prior art schemes that may suffer substantial errors in their approximation are those that employ strictly magnetic field direction finding techniques. Such systems are subject to being influenced by buried conductors (fluctuating errors of up to 40°) as described in articles by F. Horner, in "Wireless Engineer" August 1953 and an article entitled "The Accuracy of the Location of Sources of Atmospheres", IEE, Vol 101, Part III, No. 74, November 1954, and site and angular errors as described in an article entitled "Research into Lightning Protection of Distributive System, IEEE, November 1978, and an article entitled "Operational Evaluation of the Lightning Location and Protection Equipment", U.S.A.F. Detachment 11, 2 Weather Squadron PAFB, February 1981, respectively.

Pursuant to the present invention, rather than make the entire evaluation of the ground stroke and a prediction of its location on the basis of the characteristics of the signal monitored, the present invention employs a time-of-arrival discrimination scheme which employs a time synchronization base of extremely high accuracy, which is readily available throughout the United States and a significant part of the world. To this end, the inventive system detects lightning ground strokes using electric field detection equipment but then processes the received signals via a timing synchronization scheme based upon timing signals provided by the U.S. Coast Guard LORAN-C navigation network. While it is possible to carry out the present invention with other timing synchronization schemes, LORAN-C navigation equipment is particularly attractive since it is already in place through the United States and a considerable portion of the world and provides a timing reference source of extremely high accuracy, reliability and long distance (including over-the-horizon) accessibility. With this type of system, the invention is capable of providing stroke location accuracy to better than one mile at a distance of 50 miles or two miles at 100 miles distance, etc., namely, an accuracy on the order of 2 percent or less.

In order to accomplish this highly accurate ground stroke detection, the present invention employ a plurality (at least three and preferably four) of geographically separated lightning stroke monitoring stations. Each station contains a lightning stroke detector and a timing signal generator that is synchronized with the output of the timing signal generator at each other respective detection location. The timing signal generation equipment at each receiver is comprised of a LORAN-C signalling responsive receiver which monitors the same encoded signal group emitted from a common LORAN-C reference source. The reference source may be selected from any of the presently existing LORAN-C timing signal generators throughout the Coast Guard network of the United States and a large part of the world. (For practical purposes this means LORAN-C stations in the same geographical area to be monitored by the present system.)

Each of the ground stroke detection stations is further connected via a respective communication link to a central processing facility. The central processing facility may be located at one of the detection stations, if desired, although it is most likely located at a remote facility such as an airport or other vital monitoring point. Each of the stations is synchronized with the others by receipt of the LORAN-C timing signal from the selected Coast Guard timing source station of interest. As a result, the only significant error is the propagation delay differential for each listening station. Since each individual differential is fixed and known, it may be compensated at the central processing facility during the course of determining the location of the ground stroke.

When a ground stroke occurs, the electromagnetic pulse emitted is detected by each listening station, which records the time of detection of the ground stroke by sampling an internal synchronized clock at that particular station. In effect, each listening station records the time that the stroke was detected relative to the standard timing cycle emitted by the reference Coast Guard station source. This "time Byte" data is then transmitted over the communication link from the detection station of interest to the central processing station.

At the central processing station, after compensating the received time byte for relative time signal propagation delay, a calculation of the stroke location is carried out. With four listening stations, the algorithm for determing the location of the ground stroke is fairly simple, being reduced to the solution of a set of linear equations. The degree of accuracy achieved by the present invention is determined from two standpoints. The first deals with the need to sample the ground stroke waveform at the same point at each listening location in order to avoid additional relative timing error. Since ground strokes are the principal strokes of interest, the receiving station must discriminate between ground stroke waveforms and other signals such as cloud strokes and spurious noise due to other sources. Thus, the receiver at each listening station must process the waveforms and decide which are valid ground strokes. This is achieved through ground stroke discrimination circuitry which is coupled to the time byte generation equipment at the listening station.

The principal components of each listening station are those which achieve the timing synchronization accuracy relative to the reference source to which each station of interest bases its time byte. These components include a ten MHz clock as the basic clock source from which all of the timing signals, including those required for achieving synchronization with highly accurate third zero crossing portion of the 100 KHz LORAN-C signal, are derived.

With this highly accurate timing signal synchronization scheme and location determination algorithm, the present invention is capable of locating a ground stroke to within the above-referenced 2 percent accuracy. Moreover, the position of the ground stroke need not be within the geographical region whose perimeter is defined by the spacing of the listening stations. This contrasts significantly with a scheme such as described in the above cited Bates U.S. Pat. No. 3,886,553 which proposes a timing signal discrimination scheme which operates off the 60 Hz frame synchronizing pulses transmitted from most television stations. In the system of the Bates patent, location of strong signal emissions, such as lightning ground strokes, are determined by a specified triad of listening stations the perimeter defined by which containing the ground stroke. If the ground stroke occurs outside this triad region it cannot be located. As a result, both the accuracy and utility of a system such as that described in the Bates patent suffer as contrasted to the present invention.

BRIEF DESCRIPTION OF THE DRAWINGS

FIG. 3A is a timing diagram of a typical LORAN-C pulse;

FIG. 4A shows timing diagrams of signal waveforms produced at various points in the unit of FIG. 4;

FIG. 5A shows timing diagrams of pulse waveforms produced at various points in the unit of FIG. 5;

DETAILED DESCRIPTION

Figure 1:
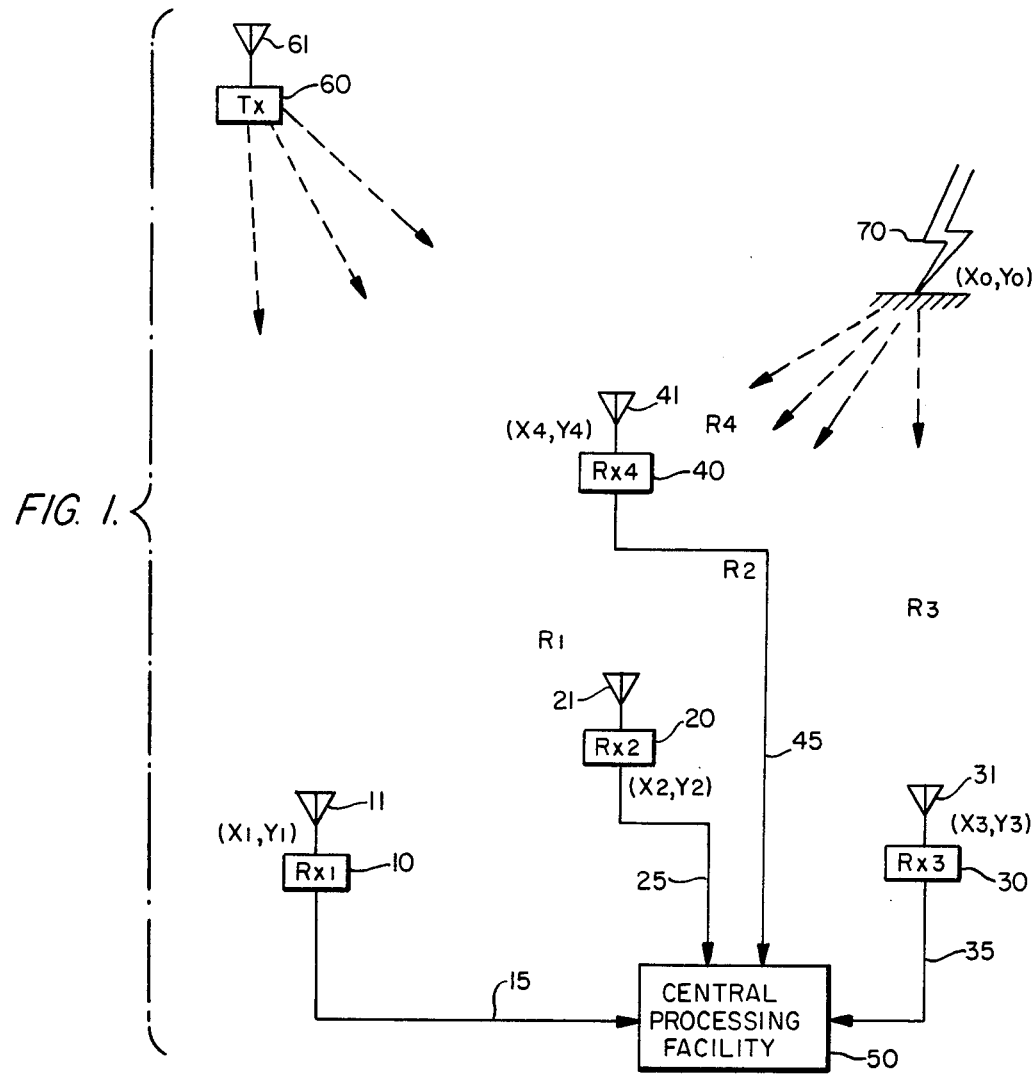
FIG. 1 is a block diagram of the overall lightning ground stroke locating system according to the present invention.

Referring now to FIG. 1, wherein a block diagram of the lightning ground stroke locating system according to the present invention is illustrated, distributed geographically throughout a region of interest are a plurality (four in the embodiment shown in FIG. 1) of lightning detection/listening stations 10, 20, 30 and 40, each of which includes a respective antenna 11, 21, 31 and 41 for receiving a time synchronization signal-containing carrier from a timing signal source 60. As explained briefly above, preferably, timing signal source 60 corresponds to one of the presently available LORAN-C group transmitting stations located throughout the United States. For the purposes of the present description, it will be presumed that transmitting station 60 is a master group station transmitting the LORAN-C carrier via an associated antenna 61.

It should be noted that although familiarity with LORAN-C navigation systems and signalling formats is a general requisite for an understanding of the description of the present to follow, the basic characteristics of LORAN-C signalling will be explained briefly below in conjunction with the description of the individual units of a receiving station, in order to provide a full appreciation for the timing signal synchronization aspects of the invention. Of course, for further educational background purposes concerning LORAN-C signalling and timing formats, attention may be directed to various reference literature, such as the LORAN-C User Handbook, U.S. Coast Guard, Frequency Dissemination Via the LORAN-C System, by C. E. Potts et al, proc. I.E.E.E., vol. 60, pp. 530–539, May 1971, for example.

Each receiving station is coupled by a respective communication link 15, 25, 35 and 45 to a central processing facility 50, typically remotely located relative to the receiving stations, such as at a weather station, an airport, etc. Each receiving station further includes an electromagnetic pulse field detector (not shown) for detecting the occurrence of a lightning ground stroke from some arbitrary location 70. When a ground stroke occurs, the electromagnetic pulse is detected at each listening station 10-40, and the time of occurrence of the detection of that ground stroke is recorded by sampling a free running clock within the station, which is internally synchronized with the clock signal generated at station 60. In effect, each listening station 10-40 records the time that the stroke is detected relative to this standard timing cycle emitted by station 60. A respective digital time byte is then transmitted from each listening station to the central processing facility 50, via communication links 15-45.

At the central processing facility 50, the individually received time bytes are compensated for LORAN propagation delay and the corrected data is then used to calculate the location of the stroke 70.

As will be explained-below in conjunction with the description of a suitable algorithm to be used for locating stroke 70, a fairly simplified mathematical procedure may be carried out using the four station arrangement shown in FIG. 1 to simply, but accurately, identify the location and, where desired, the time of occurrence, of the ground stroke.

As pointed out above, the time signal synchronization scheme employed in accordance with the present invention preferably makes use of LORAN-C signals because of their accuracy, reliability and long distance accessibility. It should be noted however, that other sources of timing signal synchronization may be employed, as long as they meet the criteria provided by the LORAN-C navigation system. The LORAN-C navigation system is especially attractive because the signal sources already exist; the invention does not require the design and implementation of a new type of signal source for timing synchronization pulses.

Furthermore, because the present invention does not base its determination of the location of the ground stroke solely from the analysis of the characteristics of the signal detected, as do many of the systems in the above-referenced prior art literature, the electromagnetic field detection components of each receiver station can be considerably simplified and, for the most part, conventional components can be employed. Of course, there are specific circuits design requirements, to be described below in conjunction with the particular equipment illustrated in the Figures, which enable the inventive system to discriminate between ground strokes and noise and to provide an accurate determination of the occurrence of each ground stroke. For this purpose, it is necessary for each station to sample the ground stroke waveform at the same point in the waveform, in order to avoid introducing relative timing errors in addition to the LORAN propagation delay errors mentioned above. Moreover, since the ground strokes are the principal strokes of interest, each receiving station must discriminate between ground stroke waveforms and other signals such as cloud strokes and spurious noise due to other sources. Thus, within each listening station, there is a stroke receiver unit which processes the detected waveforms and determines which waveforms constitute valid ground strokes. Once the waveforms have been determined to be valid ground strokes, the time at which the ground stroke was detected, as determined by the synchronized free running clock in each receiver station, is recalled and transmitted to the central processing facility for processing to obtain a determination of the location of the ground stroke itself.

Figure 2:
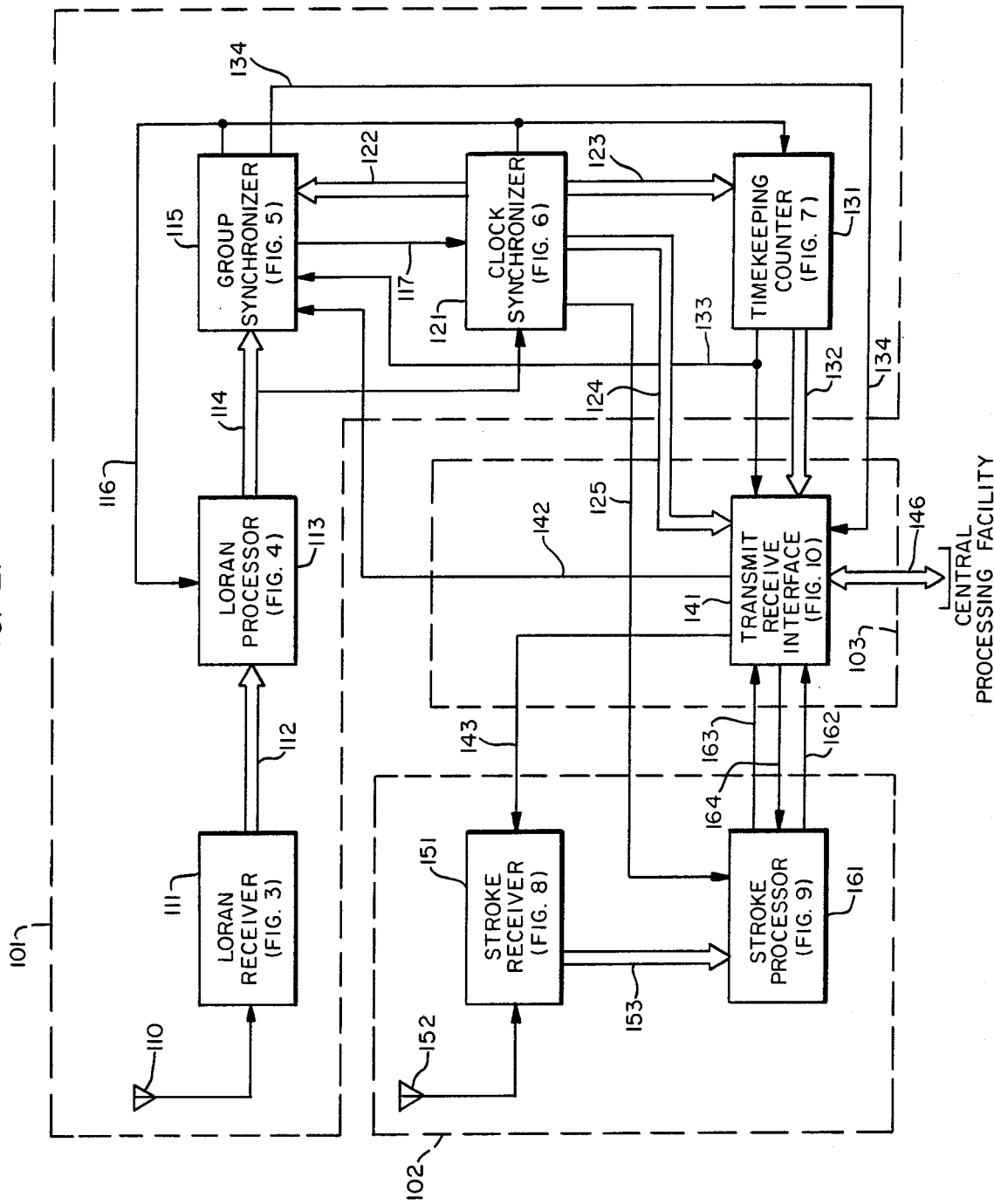
FIG. 2 is a block diagram of an individual one of the receiving stations shown in FIG. 1.

Referring now to FIG. 2, a block diagram of the general configuration of each individual receiving station is illustrated. Each receiving station is comprised principally of three components: a time synchronization subsystem 101, a stroke detection subsystem 102, and a transmit/receive interface unit 102.

The time synchronization subsystem 101 includes basic LORAN signal processing components including a LORAN receiver 111 and a LORAN signal processor 113. LORAN receiver 111 includes an antenna 110 for receiving the 100 KHz LORAN signals preferably from a designated LORAN-C master group transmitting station and converts the received signals to an acceptable signal-to-noise ratio. The LORAN receiver 111 produces an analog LORAN signal and a rectified LORAN signal over respective portions of a link 112 which is coupled to the LORAN processor 113.

The LORAN processor 113 contains a high frequency reference clock oscillator (10 MHz) that is coupled over a portion of link 114 to a group synchronizer 115 and a clock synchronizer 121 for accurate time synchronization, as will be discussed below. The LORAN processor 113 also generates hard-limited versions of the analog signal and the extremely accurate third zero-crossing portion of the LORAN-C pulse. These signals, together with a narrow pulse centered about the third cycle zero-crossing, are coupled over link 114 to the group synchronizer to provide a time window enabling signal which controls the period of operation or enablement of the LORAN processing functions. Preferably, this is carried out during the interval that a master group LORAN-C pulse is received by the listening station.

The group synchronizer unit 115 operates to generate a timing signal which is exactly in phase with, but slightly longer than, the period occupied by the first eight pulses of each master group. Through this process, the group synchronizer produces a master group gating signal on line 116. It also generates a narrow pulse centered about the highly accurate third cycle zero-crossing time of the received master group LORAN-C signal of interest and couples this signal over link 117 to a clock synchronizer 121. In order carry out these two tasks, the group synchronizer 115 requires a number of different timing signals coupled over a link 122 from the clock synchronizer 121, a master group sync signal coupled over link 133 from a timekeeping counter 131 and the processed LORAN and 10 MHz clock signal produced by a 10 MHz oscillator within the LORAN processor unit 113. The functions of these individual signals and the manner in which the group synchronizer 115 responds to the signals and generates the master gate signal and the zero-crossing time signal on lines 116 and 117 will be discussed below in conjunction with the description of the individual units.

The clock synchronizer unit 116 essentially operates to phase-lock the master timing to the LORAN 100 KHz third cycle reference zero-crossings and generates the various clocks required by the remainder of the listening station. These signals are produced over links 122-125 in a manner to be described below in conjunction with the detailed description of the clock synchronizer unit, per se.

The final components of the time synchronization subsystem 101 is a timekeeping counter 131 which is comprised essentially of a digital counter and synchronized combinational logic that produces a time byte from which the time of stroke detection is derived. This time byte is coupled over link 132 to a transmit receive interface unit 141 within the transmit/receive interphase portion 102 of the listening station. The transmit/receive interface unit 141, when enabled, transmits a data byte including the contents of the time byte 132, to the central processing facility, over link 146. Timekeeping counter 131 also produces a master group synchronization signal over link 133 to be delivered to the transmit/receive interface unit 141 and the group synchronizer 115.

The final portion of the receiving station is the ground stroke detection subsystem 102, which includes a stroke receiver 151 and a stroke processor 161. The stroke receiver 151 is coupled to a stroke detection antenna 152 which senses the vertical electric field produced by the ground stroke, and it analyzes the ground stroke to extract key information required by the stroke processor 161 to decide if the detected signal is a true ground stroke. For this purpose, stroke receiver 151 produces output signals over link 153 indicating a reference threshold crossing, and the time of the peak occurrence of the detected ground stroke waveform. The stroke processor 161 responds to these signals and to a clock signal from the clock synchronizer 121 supplied over link 125, and supplies a stroke detected signal over link 163. It also generates a transmit enable signal over link 162, so that the transmit/receive interface unit 141 will cause the previously recorded time byte, coupled thereto from timekeeping counter 131, to be transmitted to the central processing facility over communications link 146.

For a better understanding of the configuration and functional cooperation of the components shown in FIG. 2, described briefly above, attention is directed to FIGS. 3–10 of the drawings wherein the respective components shown in FIG. 2 are illustrated in detail.

Figure 3:
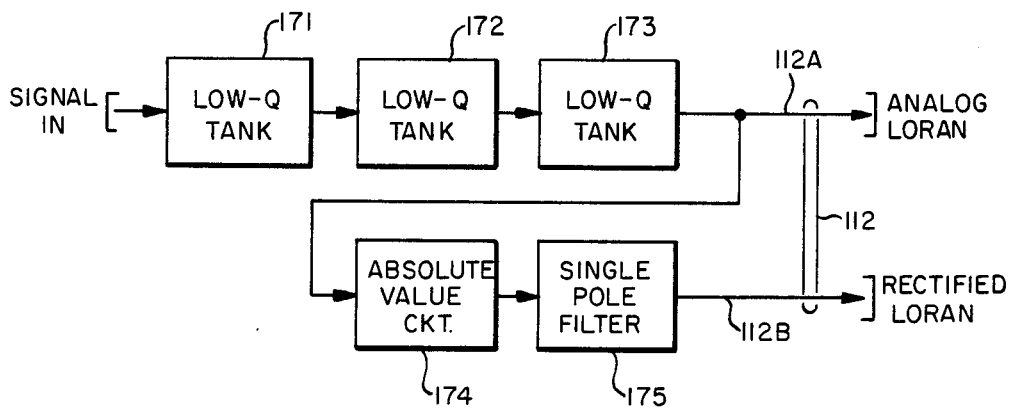
FIG. 3 is a schematic block diagram of a LORAN-C receiver.

FIG. 3 illustrates a schematic block diagram of the LORAN receiver unit 111 shown in FIG. 2. The function of this circuit is to receive the 100 KHz LORAN signal (e.g. from the master-group LORAN-C transmitter of interest) and produce an acceptable signal-to-noise ratio. The bandwidth of the receiver must be sufficient to avoid any significant alteration of the 100 KHz LORAN pulse envelope but still narrow enough to provide a high noise rejection. The band pass is selected at 100 KHz plus or minus 10 KHz at the minus 3dB points and is achieved by a cascade arrangement of three low-Q tuned tank stages 171–173. The gain of the receiver is manually adjustable and may be set at a desired output level for master group pulse amplitudes. From the output of the third stage 173 of the low-Q tuned tank stages the analog LORAN signal 112A is derived. FIG. 3A illustrates the waveform of a typical LORAN-C pulse at the 100 KHz frequency with the period between zero-crossings of the same polarity being 10 microseconds. As those familiar with LORAN-C systems are aware, LORAN-C pulses are shaped so as to permit a receiver to identify a particular cycle of the 100 KHz carrier in order to prevent ambiguities in the time of arrival and to ensure high accuracy in phase measurements between signals. Thus, it is usually the extremely accurate third cycle zero-crossing that is identified and tracked in accordance with LORAN-C signalling techniques.

The output of the third low-Q tuned tank stage 173 (FIG. 3) is further coupled to an absolute value circuit 174, the output of which is coupled through a single pole filter 175, to provide a waveform representative of the full wave rectified envelope of the LORAN pulse, shown in FIG. 3A. This rectified LORAN signal is coupled over line 112B of the link 112 to the LORAN processor 113 (to be described in detail below in conjunction with the description of FIG. 4). The filtering provided by the single pole filter 175 reduces the 100 KHz component in the rectified signal and produces the above-referenced envelope-representative signal.

Figure 4:
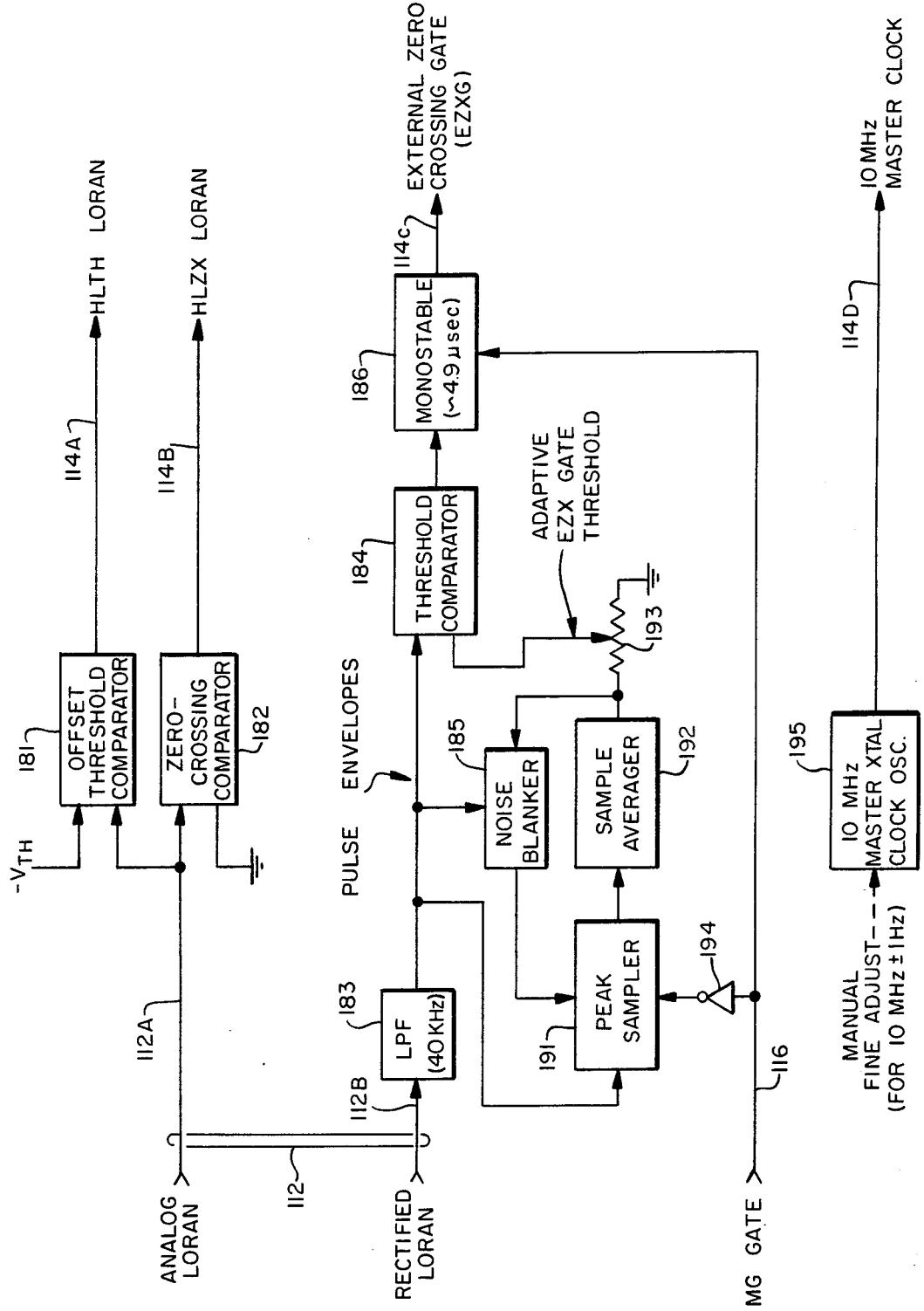
FIG. 4 is a schematic block diagram of a LORAN-C signal processing unit.

Referring now to FIG. 4, the analog LORAN-C signal coupled over line 112A is coupled to a pair of threshold comparators 181 and 182. Each of these comparators hard-limits the LORAN-C signals from the LORAN-C receiver shown in FIG. 3 to TTL logic levels for downstream processing. Threshold comparator 181 compares the analog LORAN with an offset reference voltage in order to reduce the output chatter in the absence of input LORAN-C pulses. This reduced chatter greatly reduces the probability of false phase code detection for which the output of the offset threshold comparator is used. The signal output on line 114A is identified as HLTH LORAN to be coupled to the group synchronizer 115 over link 114. Comparator 182 employs a zero reference threshold in order to precisely minimize output pulse width distortion. The high accuracy third cycle zero-crossing time of the LORAN-C pulse shown in FIG. 3A, referenced-above, but hard-limited to TTL logic levels, is extracted from this signal on line 114B by the group synchronizer. The output of the zero-crossing comparator 182 is identified as the HLZX LORAN, indicative of the, zero-crossings of the LORAN signal.

The rectified LORAN signal on line 112B from the LORAN receiver (shown in FIG. 3) is coupled to a low pass filter 183 to improve the envelope-to-noise ratio, which envelope is then coupled to a number of components. One of these components is a threshold comparator 184 which responds to an adaptive threshold level and slices the envelope just prior to the time of the occurrence of the reference third cycle zero-crossing. The output of comparator 184 triggers a 4.9 microsecond monostable circuit which generates a pulse on line 114C to be used as an external zero crossing gate (EZXG). This signal is employed by the group synchronizer 115 (FIG. 2) during timing acquisition as an average indication of the location of the reference crossing. Namely, it is employed to gate the correct hard limited zero-crossing LORAN transition.

The filtered pulse output from the low pass filter 183 also performs two other functions designed to extract a reliable tracking threshold for comparator 184. For this purpose, the signal is supplied to a peak sampler 191 which is a fast attack, slow decay circuit that outputs a voltage the average value of which is proportional to the LORAN pulse envelope amplitude. In order to avoid sampling transient noise, a noise blanker circuit 185 is coupled to receive the pulse envelope output from the filter 183 and the output of a sample average circuit 192. Basically, noise blanker circuit 185 comprises a comparator which disables the sampler 191 if a noise spike greater than a small fraction of a volt above the average LORAN amplitude supplied at the output of the filter 183 is detected. Because the noise blanker compares the filtered envelope signal with the output of the sample average 192, it effectively responds to a slowly changing average LORAN threshold, so that the average LORAN amplitude is permitted to change gradually without triggering the noise blanker circuit 185. The reference voltage is derived by potentiometer 193 coupled between the output of the sample average 192 and a reference voltage, such as ground, as shown.

Each of peak sampler circuit 191 and monostable circuit 186 is selectively enabled or gated by a master group gate signal supplied over link 116 from the group synchronizer 115. This signal effectively inhibits the operation of these components unless the LORAN-C pulse being received corresponds to the master group signal only. Namely, group signals from secondary transmitters will not affect the adaptive threshold operation.

Also included within the LORAN processor unit is a manually adjustable and highly accurate 10 MHz master clock crystal oscillator 195 which is adjusted for a precise accuracy of 10 MHz plus or minus 1.0 Hz, if possible, but less than plus or minus 10 Hz at a maximum. The highly stable and accurate signal from the oscillator 195 is coupled over line 114d to the group synchronizer 115 and clock synchronizer 121, as will be discussed below.

FIG. 4A illustrates a portion of a typical LORAN-C pulse and the timing relationship between HLTH, HLZX, and EZXG signals derived therefrom. In the upper portion of FIG. 4A, the solid line shows the actual analog LORAN-C supplied over line 112a from the receiver. This signal is an enlarged version of the LORAN-C pulse shown in FIG. 3A referred to above. The zero-crossings occur at 5 microsecond intervals, with the period of the signal being 10 microseconds, corresponding to the 100 KHz frequency of the signal. The offset threshold comparator 181 references the signal at the minus $V_{TH}$ level and produces the HLTH LORAN for the phase code detection, as illustrated by the hard limited signal 181'. The LORAN-C signal itself is represented by signal 173' (the prime corresponding to the particular circuit either in the receiver or in the signal processing unit from which the signal is derived). The filtered envelope produced by the low pass filter 183 is designated by curve 183' shown in broken line form. On line 114b the hard limited zero-crossing LORAN, precisely synchronized with the zero-crossings of the basic LORAN signal 173', is produced as timing signal 182'.

As mentioned above, the threshold comparator 184 adapts itself to a point just prior to the occurrence of the third cycle zero-crossing, which level is set at reference level 193' as shown. This occurs just prior to the third cycle zero-crossing, so that the 4.9 microsecond pulse produced by monostable circuit 186, designated as signal 186', is approximately centered, on the average, about the third cycle zero-crossing, as shown.

Figure 5:
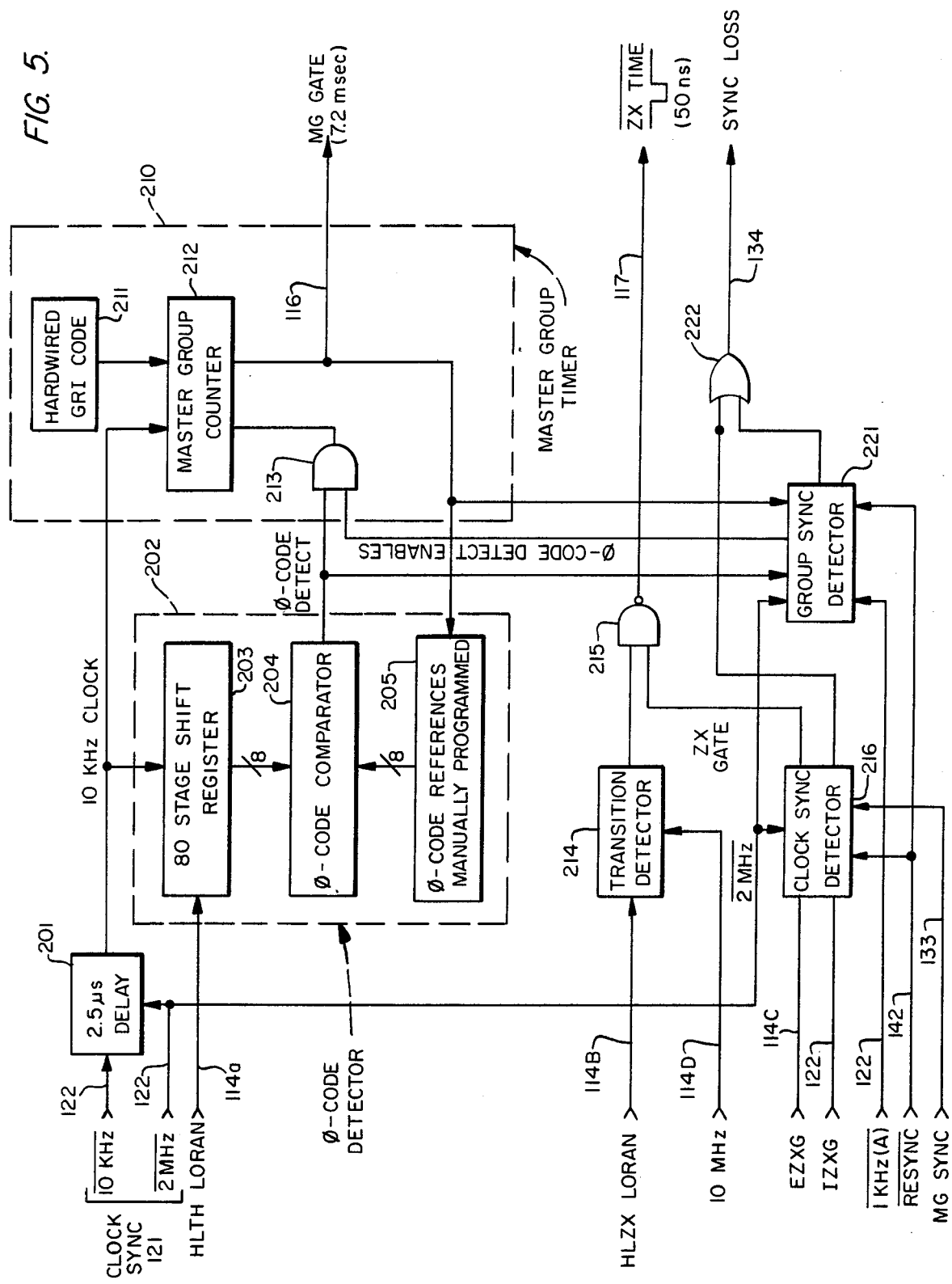
FIG. 5 is a schematic block diagram of a group synchronizer unit.
Figure 6:
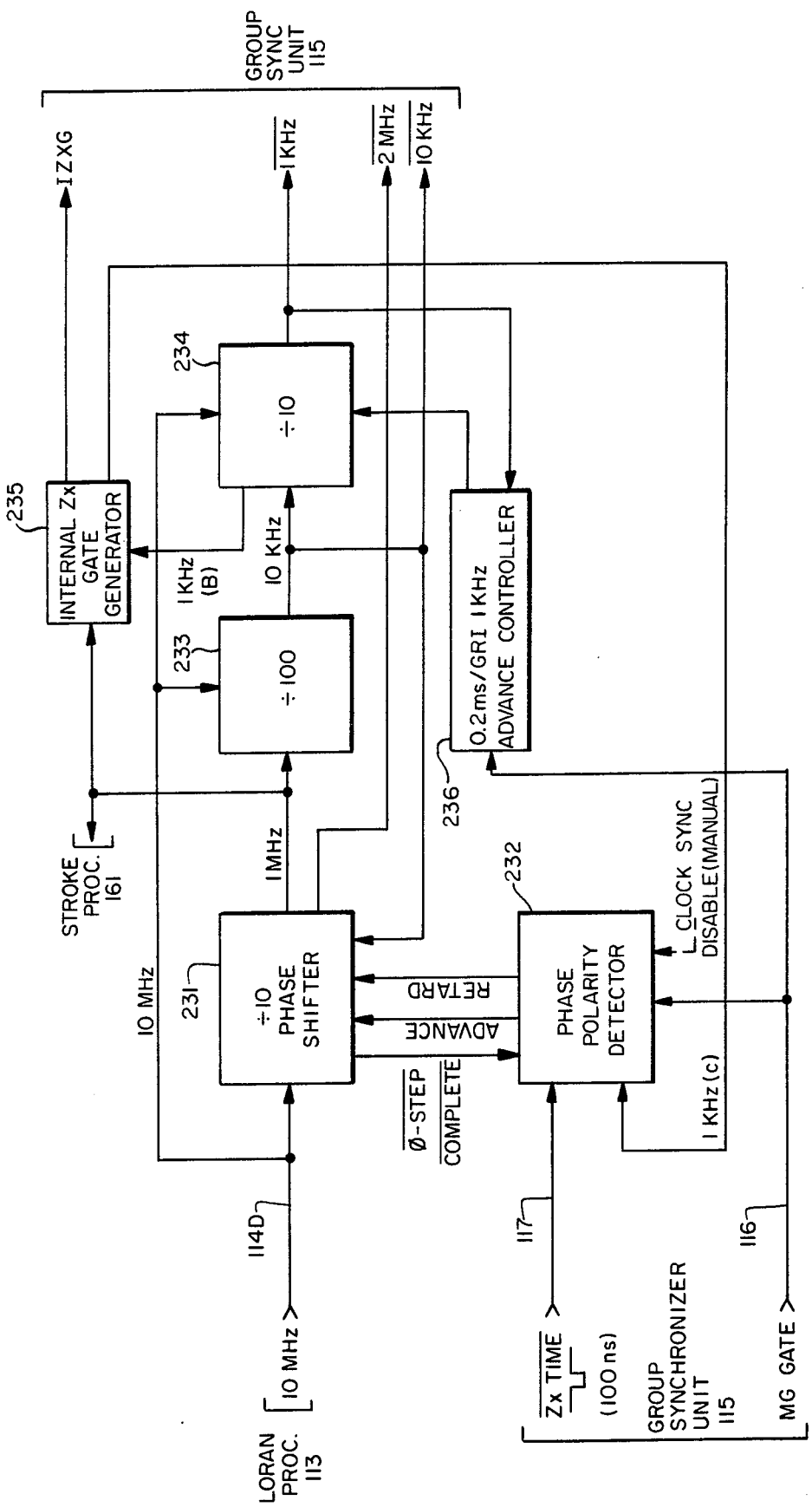
FIG. 6 is a schematic block diagram of clock synchronizer unit.

Referring now to FIG. 5, the signals on each of lines 114A-114D is supplied as a respective input to the group synchronizer unit. The group synchronizer unit also receives signals from the clock synchronizer unit 121, the transmit/receiver unit 141, and the timekeeping counter 131.

More particularly, a pair of clock signals at 10 KHz and 2 MHz, respectively, are coupled over link 122 to a 2.5 microsecond delay circuit 201. Delay circuit 201 delays the 10 KHz signal by a 2.5 microsecond delay and produces 10 KHz pulses delayed by five periods of the 2 MHz pulse input. These pulses are used to clock the hard limited threshold LORAN signal on line 114a into an eighty stage shift register 203 contained within a phase code detector 202. Phase code detector 202 further includes a phase code comparator 204 and a manually programmed phase code reference unit 205.

Phase code reference unit 205 may comprise a register the contents of which are selectively setable by a set of switches (not shown) to define the reference code for the master group within the group repetition interval of interest. As those familiar with LORAN-C signalling formats are aware, the transmitting stations of a LORAN-C chain transmit groups of pulses at a specified group repetition interval (GRI). For each chain, a minimum group repetition interval is selected of sufficient length so that it contains time for transmission of the pulse group from each station (typically 10 milliseconds for the master station and 8 milliseconds for each secondary station) plus additional time between each pulse group so that the signals from two or more stations cannot overlap in time anywhere in the coverage area. The minimum group repetition interval is, accordingly, a direct function the number of stations and the distance between them.

Each station transmits one pulse for each group repetition interval, the master pulse group consisting of eight pulses spaced one thousand microseconds apart and, usually, a ninth pulse two thousand microseconds after the eight pulse. Secondary pulse groups contain eight pulses spaced a thousand microseconds apart. The ninth pulse of the master group is not of interest as far as the present description is concerned and the code arrangement defined by the respective pluralities of the pulses of the master group correspond to those of the first eight pulses of the group, and are stored in phase code reference unit 205. Namely, the phase code of the master group station in the region of interest, namely the region in which the present invention is to be employed, is programmed into the phase code reference unit 205.

Phase code comparator 204 compares the eight bytes of the phase code reference unit 205 with the contents of eight selected stages of an 80 stage shift register 203 and produces an output when there is a match. As explained previously, the hard-limited threshold LORAN on line 114A from LORAN processor 113 consists of a sequence of pulses precisely aligned and of the same period as the zero-crossing of the LORAN-C pulses of the master group. These pulses are shown in FIG. 5A(1), there being eight LORAN-C pulses comprised of an approximate 200 microsecond burst of hard limited LORAN at the TTL logic levels of the circuitry downstream of the LORAN processor, including the group synchronizer. The pulses of each burst are illustrated in FIG. 5A(2), there being approximately a 200 microsecond time span covering each LORAN-C pulse.

Selected ones of the pulses of each 200 microsecond burst are loaded into the eighty stage shift register 203 by the 10 KHz clock signal from delay 201. The 2.5 microsecond delay imparted by delay 201 is to align the clock time with approximately the center of each 5 microsecond pulse width of the half period of each hard limited threshold pulse on line 114A as shown in FIG. 5A(2) and (3). In this fashion, during each 200 microsecond interval, at least two pulses identifying the polarity of the burst of the master group pulse will be loaded into the 80 stage shift register. During the remaining 800 microseconds of the thousand microsecond interval between master group pulses, the 10 KHz shift clock will effectively cause zeroes to be loaded into the shift register 203. Whether or not ones or zeroes are loaded in during the 200 microsecond burst will depend upon the carrier phase for that particularly burst. Namely, the pulses of each master group are defined by either an in-phase or out-of-phase (180° phase shift) for the carrier. Assuming that the burst shown in FIG. 3A represents a zero phase shift or an in-phase burst, then the sampling of the corresponding hard-limited signals for this burst would produce a "one" at the sampling time, whereas a 180° phase shift for the same burst as another pulse would have produced a "zero" at the corresponding sampling time. Thus, for the one thousand microsecond period allotted to each LORAN-C pulse burst, 10 samples will be loaded into the 80 stage shift register 203 as indicated in FIG. 5A(4). Therefore, over an eight thousand microsecond interval, which encompasses the 7,200 microsecond window of the master group, including the first eight LORAN-C pulse burst, 80 samples of the HLTH LORAN signal on line 114A will be clocked into the shift register 203 by the 10 KHz shift clock from delay circuit 201.

The contents of eight selected stages of register 203 are coupled to comparator 204, the selective stages being separated effectively by one thousand microseconds each. Thus, shift register 203 may be tapped at stages 1, 11, 21 . . . 71, so as to effectively couple eight spaced apart pulse samples stored therein to the phase comparator 204, as shown in FIG. 5A(6). As explained above, these eight samples are compared with the master group phase code reference in the unit 205. Upon the occurrence of a match, an output is produced from phase code comparator 204 as one input to AND gate 203 and one input to a group sync detector 221, indicating a phase code match. This phase code match signal is produced simultaneously with the end of the eight pulse master group.

The phase code pulse from the phase code comparator 204 is initially used to synchronize or preset a master group counter 212 which generates the 7.2 millisecond master group gate signal produced on line 116. The length of this counter is determined by a hard wired group repetition interval code stored in register 211. The hard wired group repetition interval code effectively programs counter 212 to precisely one group repetition interval in length. As an example, considering the Florida peninsula region, the group repetition interval has been established as 79.8 milliseconds.

When properly phased, and being supplied with a 10 KHz clock that is phased locked to the LORAN 100 KHz signal, as accomplished by the clock synchronizer 121 to be described below, the master group counter 212 will no longer require the phase code detect signal from phase comparator 204. When this situation is sensed, the phase code detect signal from comparator 204 is gated out.

The group synchronizer also contains the LORAN transition detector 214 which is coupled to the hard-limited zero-crossing LORAN signal on line 114B from the LORAN processor. Every transition of the HLZX LORAN signal is detected and a 100 nanosecond pulse is produced by the transition detector, the pulse width being determined by the 10 MHz clock supplied over line 114D. This transition pulse stream is gated by a zero-crossing gate signal produced by a clock sync detector 216 which is coupled to line 114C to receive the external zero-crossing gate signal from the LORAN processor and to line 122 to receive an internal zero-crossing gate signal from the clock synchronizer unit 121, to be described below. In either case, the zero-crossing gate signal has a duration of 3 to 4.9 microseconds, and a repetition frequency of 1 KHz. As a result, NAND gate 215 produces a series of 100 nanoseconds pulses having a frequency of 1 KHz which is synchronized with the 1 KHz clock from the clock synchronizer, to be described below. This signal is produced on line 117 and supplied to the clock synchronizer 121. Once internal clock synchronization has been established, as detected by the clock sync detector 216, the external zero-crossing gate (EZXG) supplied from the LORAN processor 113, which is initially employed for establishing timing acquisition, is switched off and the clock sync detector 216 relies upon an internal zero-crossing gate (IZXG) signal supplied from the clock synchronizer 121, to be described below.

The function of the clock sync detector 216 is to detect when the internal 1 KHz(c) clock transitions, which determine the production of internal zero-crossing gates signal on line 122, are in approximate phase with the LORAN reference zero-crossing transitions on line 114B. Clock sync detector 216 accomplishes this task by comparing the average overlap of the two signals, namely the average overlap between the IZXG signal and the EZXG signal. The internal zero-crossing gate signal is a four microsecond pulse that precisely straddles and tracks the internal 1 KHz clock (1 KHZ(c)) produced by the clock synchronizer unit 121, to be described below. The external zero-crossing gate signal, on the other hand, as explained above in conjunction with the description of the LORAN processor, is a 4.9 microsecond pulse obtained by slicing the LORAN pulse envelope with a threshold set approximately 2.5 microseconds in advance of the reference zero-crossing of the third cycle of the LORAN-C. As a result, the external zero-crossing gate signal, on the average, even in the presence of noise, straddles the reference zero-crossing of the third cycle. As the clock synchronizer unit 121 adjusts the phase of the internal 1 KHz clock (1 KHz(c)) into an alignment with the reference zero-crossing signal, the two zero-crossing signals IZXG and EZXG will begin to overlap each other. When the average overlap equals 4 microseconds, clock sync detector 216 functions to declare that clock synchronization has been established by setting a latch and switching to the stable IZXG pulse, so as to gate the reference zero-crossing signal to NAND gate 215.

Since the external zero-crossing gate signal is subject to minor deviations or jitter due to noise on the LORAN-C envelope, the clock sync detector 216 cannot make a decision on only a single four microsecond overlap. Thus, the average overlap over some period of time must be examined. This is effected by incorporating, within the clock sync detector 216, and up/down counter which counts up each time a four microsecond overlap occurs and counts down once for each master group interval. Therefore, in order to eventually reach full scale and establish an in-sync condition, the four microsecond overlap must occur more than once per master group interval, on the average. Even if the counter with the clock sync detector 216 reaches zero, the latch is reset and an out of sync signal is coupled through NOR gate 222 over line 134 from the clock sync detector 216, and the external zero crossing gate signal (EZXG) is switched through the circuit 216 to NAND gate 215. The counter is then reset to half scale from either a full or zero scale condition and the above process is repeated.

Also included within the group synchronizer unit is a group sync detector unit 221 which is coupled to receive the 1 KHz clock signal 1 KHz(a) over line 122 from the clock synchronizer 121, a resync signal on line 142 from the transmit/receiver interface unit 141, and a master group sync signal on line 133 from the timekeeping counter 131. The group sync detector 221 also receives the 2 MHz clock on line 122 from the clock synchronizer unit 121, the phase code detect signal from the phase comparator 204, and the master gate window signal, namely the 7.2 millisecond window signal, from the master group counter 212 on line 116.

The group sync detector 221 operates to determine that the master group gate signal produced on line 116 is properly phased with the actual LORAN master group. As explained previously, within the exemplary 79.8 millisecond group repetition interval for the chosen exemplary Florida region there is the master group pulse interval with the pulses occupying a 7,200 microsecond time slot at the beginning of the group repetition interval (FIG. 5A). In order to determine that this master group signal is properly phased with the master group gate signal produced by the counter 212, the group sync detector 221 compares the time of occurrence of the phase detect pulse produced by phase code comparator 204 with the state of the master group gate signal on line 116. If the phase detect signal occurs most of the time when the master group gate is high, then there is proper phasing between the two. If it occurs generally when master group gate signal is low, then the phasing is not correct. Since noise can cause a phase detect signal to occasionally occur at random incorrect times, the group sync detector must examine the average occurrence. To this end, as in the case with the clock sync detector 216, the group sync detector 221 includes an up/down counter which is clock by the phase detect signal from the phase comparator 204 and programmed to count up or count down by the master group signal on line 116. If the phasing is correct, the counter will average counting up. When full scale of the counter is reached, causing roll over, an in sync condition is indicated and a flip-flop within the group sync detector, which responds to the roll over of the counter, is set. From this full scale condition, the roll over of the counter switches to a half scale or a half full condition and commences counting up again, on the average, if the group sync condition is correct. If the phase detect signal from phase code comparator 204 is not correctly phased with the master group signal on line 116, the counter will begin counting down until eventually a zero condition is reached. This condition causes the flip-flop within the detector 221 to be reset and to couple a sync loss signal through OR gate 222 to line 134. The counter is again caused to roll over to half scale and will continue to count down again until correct sync is established. Assuming that, on the average, the phase code detect signal from the phase code comparator 204 is occurring with the 7.2 millisecond interval of the master group gate pulse on line 116, then the phase code detect signal will no longer be required, so that the phase code detect enable signal from the group sync detector 221 to one of the inputs of and gate 213 goes low or false and the master group counter 212 is permitted to run freely. Group synchronization is not lost eventually because of drift, because when clock synchronization is established, the 10 KHz clock signal from the clock synchronizer unit 121 will be effectively phased locked to the LORAN-C signal. The manner in which the clock synchronized unit 121 operates to achieve this lock condition will be described below in conjunction with FIG. 6.

The function of the clock synchronizer 121 is to phase lock the master timing to the LORAN 100 KHz third cycle reference zero-crossings and generate respective clock signals required by the remainder of the listening station. For this purpose, the clock synchronizer unit includes a phase polarity detector 232 which is coupled to receive the 100 nanosecond pulse width zero-crossing signal (having a frequency of 1 KHz) on line 117 and the 7.2 millisecond master group gate window signal on line 116 from the master group counter 212 in the group synchronizer unit 115. Phase polarity detector 232 also receives a 1 KHz clock signal (1 KHz(c)) from an internal zero-crossing gate generate 235. When enabled by the master group gate 116, phase polarity detector 232, which consists essentially of a pair of dual flip-flops, determines the relative phase of the 100 nanosecond zero-crossing time pulse on line 117 and the locally generated 1 KHz(c) clock from generator 235. Depending upon the phase relationship between these two signals, phase polarity detector 232 will couple a respective advance or a respective retard signal to a divide-by-ten phase shift circuit 231. Phase shifter 231 normally operates to divide the 10 MHz master clock signal supplied over line 114D from the LORAN processor 113 by ten. However, when an advance command is received from phase polarity detector 232, the divide-by-ten phase shifter will advance the divided or 1 MHz output clock phase by 1 period of the input 10 MHz clock, namely, 0.1 microseconds, and will reset the polarity detector by coupling to it a phase step complete signal.

The 1 MHz clock produced by the divide-by-ten phase shifter 231 is divided down by a divide-by-one hundred divider 233 which produces a 10 KHz output signal to be supplied to the group synchronizer unit, described previously. This 10 KHz signal is also supplied to phase shifter 231. A 1 MHz signal from the divide-by-ten phase shifter 231 is further supplied to the internal zero-crossing gate generator 235 which generates the four microsecond pulses of the internal zero-crossing gate signal supplied over link 122 to the group synchronizer. The frequency of the pulses is 1 KHz as determined by the 1 KHz(B) signal supplied by a further divide-by-ten divider 234, which is coupled to the output of divide-by-one hundred divider 233. The 1 KHz(C) signal from the internal zero-crossing gate generator 235 is coupled to the phase polarity detector 232, as explained previously.

Thus, during its operation, as long as phase polarity detector 232 detects an out-of-phase condition between the zero-crossing time signal on line 117 and the 1 KHz signal produced by the internal zero-crossing gate generator 235, it will adjust the 1 MHz clock produced at the output of divide-by-ten phase shifter 231 in either an advance or retard (delayed) fashion, in 0.1 microsecond steps, until clock acquisition is achieved.

The internal zero-crossing gate generator 235 is merely used to produce the four microsecond IZXG signal described previously, which is centered exactly on the positive (clock) edge of the 1 KHz(c) signal. The 1 KHz(c) signal is identical with the 1 KHz(b) signal except that it is delayed by two microseconds to provide the exact centering required.

The clock synchronizer unit further includes an advance controller circuit 236 which simply steps or advances the phase of the 1 KHz clocks produced by divide-by-ten divider 234 by precisely 0.2 milliseconds for the occurrence of each group repetition interval (between master groups). This function is carried out to provide alignment with the 79.8 fractional millisecond group repetition interval employed in the exemplary geographical area chosen for the present embodiment, i.e. the Florida area.

Figure 7:
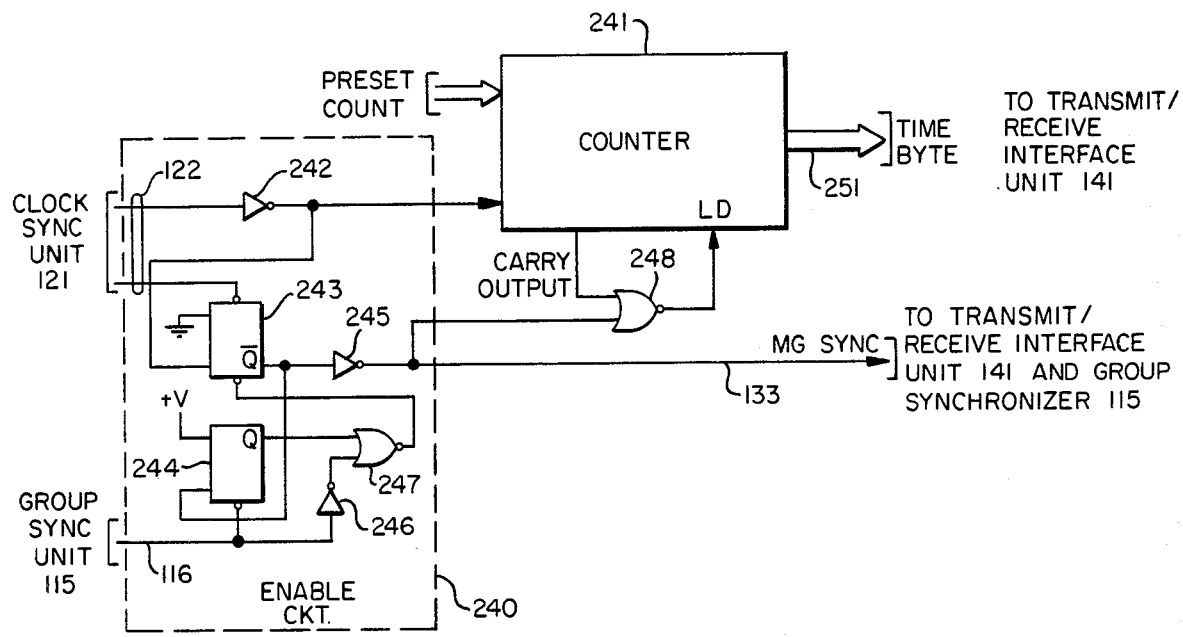
FIG. 7 is a schematic logic diagram of a timekeeping counter.

Referring now to FIG. 7, the timekeeping counter, which is the reference timing circuit from which the time of stroke detection is recorded, is shown. Basically, the timekeeping counter operates to record the time of stroke occurrence relative to a common reference time derived from or controlled by the LORAN master group station. Pursuant to the invention, the reference has been chosen to be the instant marking the beginning of each LORAN-C group repetition interval, which is defined as the third cycle reference zero-crossing in the first master group pulse of each group repetition interval. The timekeeping counter is preset at this point in time (by MG sync 133) and the length of the counter is such that it is exactly at the same count at the beginning of each group repetition interval, as long as time synchronization is maintained.

The timekeeping counter itself includes a programmable or presetable multistage digital counter 241, which is incremented by the 2 MHz clock signals on link 122 from the clock synchronizer unit. Counter 241 may comprise a sixteen stage counter, thereby providing a potential count length up to 32.768 milliseconds. Since this length is not an integral submultiple of the exemplary 79.8 millisecond group repetition interval, the same counter state would not result at each group repetition interval boundary and it is necessary, therefore, to reduce the count length by rolling it over to a preset value rather than all zeroes. This may be accomplished by using a value that is an integral submultiple of the group repetition interval. For purposes of providing an exemplary embodiment, let it be assumed that the count length of the counter is 26.6 milliseconds. As such, the preset value of the counter may be strapped at 12.336 milliseconds. Thus, the counter will begin counting from the value 12,336 and be successively incremented by the 0.5 microsecond pulses supplied from the 2 MHz clock signal until the counter rolls over upon reaching the count of 32.767, to the value preset at 12.336.

The count length is determined by the requirement to avoid station-to-station counter cycle ambiguity. Counter offsets due to LORAN propagation delay differentials do not contribute to this ambiguity, because they are fixed and can be easily calculated and compensated at the central station. The lower boundary on the count length is obviously the base line distance (in time) between the two most widely separated stations within the system. Counter 241 cannot be permitted to cycle or roll over during the time that it takes a lightning stroke waveform to propagate from one station to another. A more severe or larger lower boundary is imposed by the worst-case station-to-station central data transmission time uncertainty. The central processing facility is capable of approximating the transmission time from each station by directing or commanding self-test transmissions with the LORAN-C group repetition interval start times. These start times are stored in memory and may be automatically and frequently updated. Significant uncertainty still exists, however, because of telephone line jitter and the chances of automatic diversity switching and channel rerouting between channel propagation delay update measurements. Accordingly, it is necessary to make a counter as long as practically possible, while still reducing the number of data bits (transmission time) to a sufficiently small number to permit frequent observation of successive strokes within the same lightning flash. For the exemplary embodiment chosen, using the 79.8 millisecond group repetition interval and the station spacing within the Florida peninsula chain, a count length of 26.6 milliseconds has been found to be satisfactory with a data transmission rate of 1,800 Baud optimal or 1,200 Baud minimum.

The outputs of the sixteen stages of counter 241 are coupled over a sixteen bit data link 251 to the transmit/receive unit 141. The timekeeping counter also includes an enable circuit 240 which receives the master group gate signal 116 from the group synchronizer unit and the 1 KHz(a) clock synchronizer on line 122. Enable circuit 240 includes a pair of flip-flops 243, 244, respective inverters 242, 245 and 246, and a NOR gate 247, coupled as shown, with a master group sync signal being coupled from the inverter 245 which is coupled to the Q output of flip-flop 243. This master group sync signal is coupled to line 133 as one input to a further NOR circuit 248. NOR circuit 248 receives the carry output of the last stage of the counter and is coupled to enable the roll over of the counter or reset the counter. The master group sync signal is also coupled over line 133 to transmit/receive interface unit 141 and the group synchronizer unit 115.

This master group sync signal is employed to synchronize the counter at the beginning of each group repetition interval. It is generated by a combination of the master group gate signal on line 116 and the first 1 KHz(a) pulse after the master group gate signal, which is in exact synchronism with the reference zero-crossing of the third cycle of the first master group pulse burst. Flip-flops 243 and 244 are caused to lock-up after a single master group sync pulse is generated on line 133 until the master group gate changes state or goes false and then becomes true again, namely, at the beginning of the next group repetition interval.

It should be observed that the counter 241 is continuously clocked, with the outputs being coupled to the transmit/receive interface unit 141 which selectively samples the count state whenever a ground stroke occurs. As will be explained below, the transmit/receive unit then stores the sample in buffer registers for transmission to the central processing station.

Figure 8A:
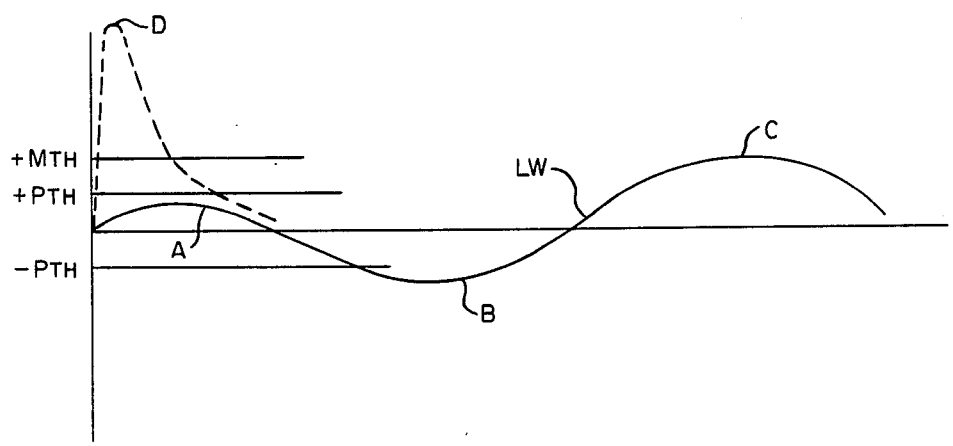
FIG. 8A shows stroke waveforms useful in explaining the operation of FIG. 8.
Figure 8:
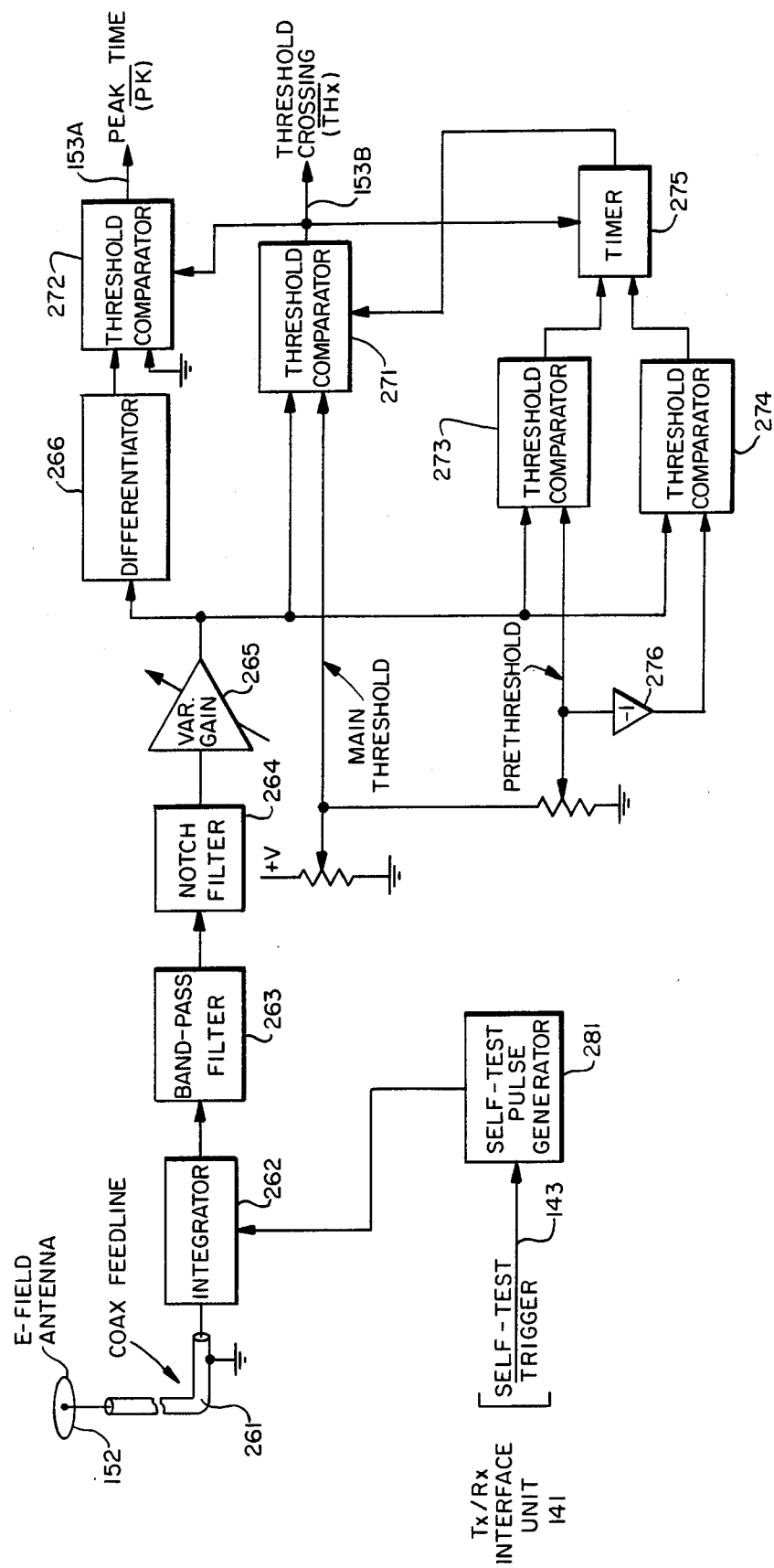
FIG. 8 is a schematic block diagram of a stroke receiver.
Figure 9:
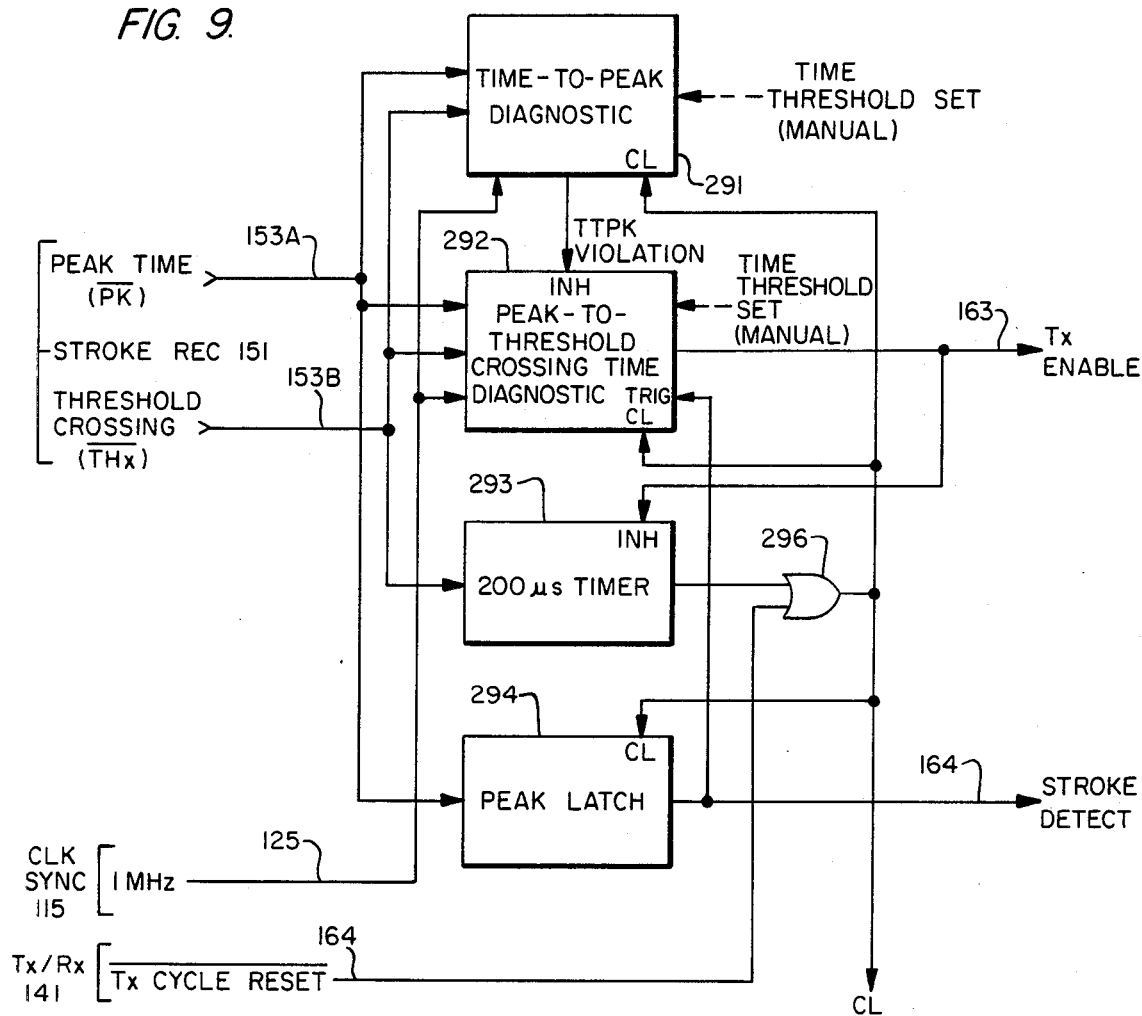
FIG. 9 is a schematic block diagram of a stroke processor unit.

The components of the lightning ground stroke subsystem are shown in FIGS. 8 and 9. FIG. 8 illustrates the stroke receiver, whereas the stroke processor unit is shown in FIG. 9. With the exception of the use of the 1 MHz clock from the clock synchronizer unit 115, the ground stroke detection subsystem is completely independent of the timing subsystem. Referring to FIG. 8, an E-field antenna, separate from the antenna for receiving a timing signal from the LORAN-C master group station, is coupled through a coaxial transmission line 261 to an input integrator amplifier 262. Antenna 152 senses the vertical electric field produced by the ground stroke and a replica of the early portion of the stroke channel current waveform is produced at the output of integrator amplifier 262.

The output of integrator amplifier 262 is then coupled through an extremely wide band pass 263 filter having 301. The contents of the input link are stored in the buffer 301 in response to a stroke detect signal on line 164 from the stroke processor and in synchronization with the 2 MHz clock from the clock synchronizer. The storage buffer 301 is coupled via link 302 to UART 303 which assembles and transmits successive bytes of data over outgoing communication link 305 to the central processing station. The UART timing source for the communication transmission is supplied from clock circuit 304 whereas the timing signals for various operations are carried out by timing logic circuit 306. Timing logic circuit 306 essentially comprises a group of combinational logic that responds to the signals coupled to the transmit/receive unit from the other units, described above, for controlling the reception and transmission of information or system operation. The timing logic circuit receives the transmit enable circuit from the stroke processor on line 163 and a 10 KHz clock signal from the clock synchronizer on link 122 for controlling the coupling of the data and the transmission of the 2 bytes of information stored in buffer register 301 through the UART to the central processing facility. A loss of sync signal on link 134 in group synchronizer is coupled to the timing logic circuit and is ORed with a self test request link from the UART to trigger the self test line 143 coupled to the stroke receiver shown in FIG. 8 for carrying out the self test. Resync line 142 is coupled to the group sync detector 221 in the group synchronizer 115 and the transmit cycle reset signal 164 is coupled to OR gate 296 in the stroke processor 161.

Buffer 301 is essentially comprised of a pair of eight bit buffers which are individually read out by the UART and serially transmitted to the central processing facility under the control of the carrier clock from clock generator 304.

In addition to transmitting the two eight bit words representative of the value of the timekeeping counter upon receipt of a stroke, the unit is also capable of receiving single eight bit words from the central processor for control purposes. Only a few of these bits are used for command and test purposes. One bit is used to enable a self test which commences at the start of the following group repetition interval. This consists of generating a facsimile stroke pulse which is triggered by the master group sync signal on line 133. The timing logic uses the master group sync signal to generate the self test trigger signal on line 143 to the stroke receiver. The purpose of this signal is to simulate the receipt of a stroke coincident with the start of a new GRI and cause a stroke receiver to behave as though an actual ground stroke were detected. The resulting self test stroke time is thus always the same and occurs only a few counts subsequent to timekeeping counter roll over. For purposes of the present description, it will be assumed that the self test stroke is triggered at the beginning of every group repetition interval (here, every 79.8 milliseconds).

Another bit of the eight bit word that is available may be used to command resynchronization. In response to this command, the group synchronizer unit is reset by the resync signal, whereas the stroke processor is reset by the transmit cycle reset signal.

In operation, the current value of the timekeeping counter is always made available via link 251 to buffer register 301. Upon the occurrence of a stroke detect signal on link 164, the value of the timekeeping counter at the occurrence of the stroke detection signal is stored in buffer 301. The contents are clocked in by the 2 MHz signal on line 122, as mentioned above. Then, in response to the transmit enable signal coupled on line 163 from the stroke processor, timing logic circuitry 306 causes the contents of the two registers within the storage buffer 301 to be coupled to the UART for transmission to the central processing station over link 305.

The central processing station also includes a communication unit, such as its own associated UART, processor and associated memory. As the time bytes are received from each of the stations of the network, the time-of-receipt data is stored and subsequently corrected or modified for propagation delay differentials, as explained previously. Compensation may be accomplished by either adding or subtracting a stored LORAN-C propagation delay time correction factor to each byte.

The processor then groups the received bytes by time-of-receipt windows and maximum possible differential time windows in order to identify bytes that occurred for the same stroke. Using this time byte information, the exact position of the stroke can be calculated. Because of the preferable use of four stations, although three will suffice, the mathematics for locating the position of the stroke based upon the time bytes that have been received and corrected is substantially simplified.

More particularly, referring again to FIG. 1 of the drawings, the geographical location at which the arbitrary ground stroke occurs may be designated as having stroke coordinates $(X_0, Y_0)$. It will be assumed that the time of occurrence of this stroke is at time $t_0$ in the chosen system of rectangular coordinates. The four listening stations 10, 20, 30 and 40 are located at rectangular coordinate positions $(X_1, Y_1)$, $(X_2, Y_2)$ $(X_3, Y_3)$ and $(X_4, Y_4)$. These listening stations respectively detect the electrical pulse signals resulting from the strokes at times $T_1$, $T_2$, $T_3$ and $T_4$. The procedure that is carried out by the central processing station is to determine the stroke coordinates $(X_0, Y_0)$ based upon the known information, namely, the listening station coordinates and the observed times of arrival.

The ranges from the stroke to each station are $$R_1 = (T_1 - T_0) V \tag{1}$$

$$R_2 = (T_2 - T_0) V \tag{2}$$

$$R_3 = (T_3 - T_0) V \tag{3}$$

$$R_4 = (T_4 - T_0) V \tag{4}$$

where V is the velocity of propagation of the electrical signal. Note that at this point the ranges are unknown since the time of occurrence of the stroke, $T_0$, is not known. Four circle equations relating the unknowns $X_0$, $Y_0$ and $T_0$ to the known quantities can be written:

$$(X_1 - X_0)^2 + (Y_1 - Y_0)^2 = (T_1 - T_0)^2 V^2 \tag{5}$$

$$(X_2 - X_0)^2 + (Y_2 - Y_0)^2 = (T_2 - T_0)^2 V^2 \tag{6}$$

$$(X_3 - X_0)^2 + (Y_3 - Y_0)^2 = (T_3 - T_0)^2 V^2 \tag{7}$$

$$(X_4 - X_0)^2 + (Y_4 - Y_0)^2 = (T_4 - T_0)^2 V^2 \tag{8}$$

Expanding (5)–(8) yields $$X_1^2 - 2X_0 X_1 + X_0^2 + Y_1^2 - 2Y_0 Y_1 + Y_0^2 - V^2(T_1^2 - 2T_0 T_1 + T_0^2) = 0 \tag{9}$$

cut off points at approximately 1.5 and 500 KHz. The output of the bandpass filter 263 is coupled through a notch filter 264 for additional broadcast radio station signal suppression and thence to a variable gain amplifier 265 to establish signal amplitudes in accordance with the desired detection range. The output of the variable gain amplifier 265 is coupled to a differentiator 266 and a threshold comparator 271. Threshold comparator 271 compares the signal from amplifier 265 with an established threshold and is employed to alert the system that a possible stroke is taking place. Differentiator 266 locates the point in time in which the waveform peak occurs and marks the detection time. By coupling the output of the threshold comparator 271 to enable a threshold comparator 272 which is coupled to the output of the differentiator 266, there are obtained a pair of stroke indication signals. The first signal, on line 153B at the output of threshold comparator 271, indicates the timing-location of the threshold crossing of the ground stroke signal. The second signal, on line 153A at the output of threshold comparator 272, indicates the time of the peak of the ground stroke, which must follow after the initial threshold crossing as indicated on line 153B.

Circuit functions 273 through 276 comprise a means of increasing the rejection probability of strokes occurring beyond the range of interest. It has been observed that very often ground stroke waveforms that have propagated over several hundred or perhaps thousands of miles are characterized by a very strong fundamental component in the 5-to-15 KHz region. These waveforms are represented by waveform LW having portions A, B and C as shown in solid line form in FIG. 8A. Superimposed on waveform LW is a lightning ground stroke waveform D within the range of interest. The maximum peak value achieved by waveform LW may not occur until the second (portion B) or even third (portion C) half-cycle peaks of the fundamental before decaying. If the signal amplitude at one receiver is such that the first peak is just below the main threshold but the second is above it, then the wrong peak will be detected (the first peak is always the one of interest). If the signal is somewhat stronger at another receiver such that the first peak is above the main threshold, then the correct peak will be sampled, and the difference between the time-of-arrival samples will be in error by the time separation of the first and second peaks. Since the first peak is generally not less than 25–50% of subsequent peaks in these cases, a pre-threshold scaled from the main threshold is employed to detect this situation and reject the signal LW but detect waveform D. This is accomplished by applying the prethreshold ($P_{TH}$) and its complement ($-P_{TH}$) as generated by linear inverter amplifier 276 to a pair of threshold comparators 273 and 274. A signal exceeding either prethreshold polarity will trigger timer 275. If the main threshold ($M_{TH}$) is not exceeded within a few microseconds after the prethreshold (as indicated by line 153B), the timer will output an inhibit signal to threshold comparator 271. The duration of the inhibit is sufficient to prevent operation until the signal LW beyond the range of interest has completely disappeared.

The stroke receiver also includes a self test pulse generator 281 which responds to a command signal on line 143 from a transmit/receiver interface unit 141 to trigger the circuit to carry out a self test stroke detection operation. The self test generator simulates an actual ground stroke waveform and may be actuated without interfering with normal stroke processing.

The signals on lines 153A and 153B are coupled to respective units of the stroke processor shown in FIG. 9. Both the peak time and the threshold crossing on lines 153A and 153B respectively are coupled to a time-to-peak counter 291 and a peak-to-threshold crossing time counter 292. Each of these counters is clocked by the 1 MHz clock on line 125 from the clock synchronizer unit 121. The peak time signal on line 153A is further coupled to a peak storage flip-flop 294, whereas a threshold crossing time signal line 153B is coupled to a 200 microsecond timing circuit 293. Each of the counters 291 and 292 and flip-flop 294 is cleared or reset by the output of an OR gate 296. One input of OR gate 296 is coupled to the output of the 100 microsecond timer 293 and the other input is coupled to a transmit cycle reset signal on line 164 from transmit/receive interface unit 141.

The output of peak-to-threshold counter 292 is coupled to inhibit the timer 293 and to supply a transmit enable signal over line 163 to the transmit/receive interface unit 141. The output of the peak storage flip-flop 294 is coupled to the trigger or enable input of counter 292 and to the stroke detect line 164.

In operation, the threshold crossing signal on line 153B initially triggers counter 291, to begin counting the 1 MHz clock signal on line 125. This signal is also used to trigger a timer 293. Counter 291 counts the clock signals on line 125 until the peak time dictated by the signal on line 153A. The count value obtained is compared within the counter 291 with a threshold value that is manually set. This value is a maximum acceptable value. If the time-to-peak count value exceeds the maximum value, an inhibit signal is supplied to the counter 292. Otherwise, the peak-to-threshold crossing time counter 292 is not disabled. The threshold crossing of counter 292 is manually adjustable. Counter 292 then measures the fall time from peak to the threshold and compares the count value with a minimum acceptable value. This is achieved by counting the 1 MHz clock signals on line 125 between the receipt of the peak time signal on line 153A and a subsequent threshold crossing signal on line 153B. If the count value is acceptable, a Tx ENable signal is supplied on line 163 to the transmit/receive interface unit. This also inhibits the timer 293.

The storage of the peak time in flip-flop 294 provides a stroke detection signal over line 164 to the transmit/receive unit 141.

The purpose of timer 293 is to inhibit all functions and reset to normal operation if a transmit enable signal is not generated by the peak-to-threshold counter 292 within a 200 microsecond interval of the initial threshold crossing. This effectively prevents erroneous ground strokes from creating a detection anomaly.

Figure 10:
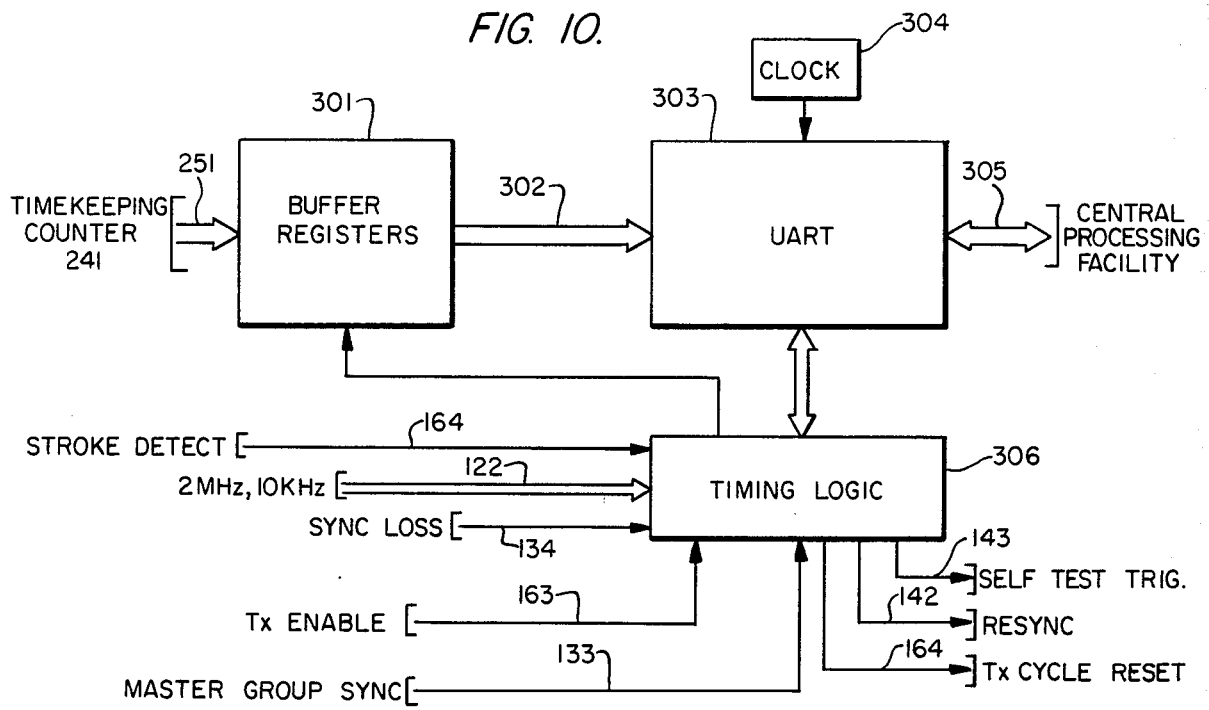
FIG. 10 is a schematic logic block diagram of a transmit-receive interface unit.

The data communication (transmit/receive) interface unit 141 which stores the value of the timekeeping counter upon the occurrence of a valid ground stroke and transmits this information to the central processing facility is shown in detail in FIG. 10. Basically, the transmit/receive interface unit 141 includes a storage buffer 301 for storing data representative of the value of the time keeping counter at the instant of detection of a ground stroke, a universal asynchronous receiver/transmitter (UART) unit 303, a UART clock 304, and a timing circuit 306.

The sixteen bit communication link 251 coupled from the timekeeping counter to a sixteen bit storage buffer $$X_2^2 - 2X_0X_2 + X_0^2 + Y_2^2 - 2Y_0Y_2 + Y_0^2 - V^2(T_2^2 - 2T_0T_2 + T_0^2) = 0 \quad (10)$$

$$X_3^2 - 2X_0X_3 + X_0^2 + Y_3^2 - 2Y_0Y_3 + Y_0^2 - V^2(T_3^2 - 2T_0T_3 + T_0^2) = 0 \quad (11)$$

$$X_4^2 - 2X_0X_4 + X_0^2 + Y_4^2 - 2Y_0Y_4 + Y_0^2 - V^2(T_4^2 - 2T_0T_4 + T_0^2) = 0 \quad (12)$$

This system is "over-specified" in that there are four quadratic equations in three unknowns. A mathematical "trick" takes advantage of this redundancy to reduce the complexity of the problem to that of three independent linear equations in $X_0$, $Y_0$ and $T_0$. Subtract equation (12) from each of (9)–(11) to give $$X_1^2 - X_4^2 - 2X_0(X_1 - X_4) + Y_1^2 - Y_4^2 - 2Y_0(Y_1 - Y_4) - V^2(T_1^2 - T_4^2) + 2V^2T_0(T_1 - T_4) = 0 \quad (13)$$

$$X_2^2 - X_4^2 - 2X_0(X_2 - X_4) + Y_2^2 - Y_4^2 - 2Y_0(Y_2 - Y_4) - V^2(T_2^2 - T_4^2) + 2V^2T_0(T_2 - T_4) = 0 \quad (14)$$

$$X_3^2 - X_4^2 - 2X_0(X_3 - X_4) + Y_3^2 - Y_4^2 - 2Y_0(Y_3 - Y_4) - V^2(T_3^2 - T_4^2) + 2V^2T_0(T_2 - T_4) = 0 \quad (15)$$

Rearranging $$2(X_1 - X_4)X_0 + 2(Y_1 - Y_4)Y_0 + 2V^2(T_4 - T_1)T_0 = X_1^2 - X_4^2 + Y_1^2 - Y_4^2 + V^2(T_4^2 - T_1^2) \quad (16)$$

$$2(X_2 - X_4)X_0 + 2(Y_2 - Y_4)Y_0 + 2V^2(T_4 - T_2)T_0 = X_2^2 - X_4^2 + Y_2^2 - Y_4^2 + V^2(T_4^2 - T_3^2) \quad (17)$$

$$2(X_3 - X_4)X_0 + 2(Y_3 - Y_4)Y_0 + 2V^2(T_4 - T_3)T_0 = X_3^2 - X_4^2 + Y_3^2 - Y_4^2V^2(T_4^2 - T_3^2) \quad (18)$$

Define $$\left. \begin{array}{l} A_i = 2(X_i - X_4) \quad (19) \\ B_i = 2(Y_i - Y_4) \quad (20) \\ C_i = 2V^2(T_4 - T_i) \quad (21) \\ D_i = X_i^2 - X_4^2 + Y_i^2 - Y_4^2 + V^2(T_4^2 - T_i^2) \quad (22) \end{array} \right\} i = 1,2,3$$

Equations (16)–(18) now become $$A_1X_0 + B_1Y_0 + C_1T_0 = D_1 \quad (23)$$

$$A_2X_0 + B_2Y_0 + C_2T_0 = D_2 \quad (24)$$

$$A_3X_0 + B_3Y_0 + C_2T_0 = D_3 \quad (25)$$

Cramer's Rule can now be applied to solve for $X_0$ and $Y_0$ (and $T_0$, if desired).

$$X_0 = \left[ \frac{D_1(B_2C_3 - B_3C_2) - D_2(B_1C_3 - B_3C_1) + D_3(B_1C_2 - B_2C_1)}{A_1(B_2C_3 - B_3C_2) - A_2(B_1C_3 - B_3C_1) + A_3(B_1C_2 - B_2C_1)} \right] \quad (26)$$

$$Y_0 = \left[ \frac{A_1(D_2C_3 - D_3C_2) - A_2(D_1C_3 - D_3C_1) + A_3(D_1C_2 - D_2C_1)}{A_1(B_2C_3 - B_3C_2) - A_2(B_1C_3 - B_3C_1) + A_3(B_1C_2 - B_2C_1)} \right] \quad (27)$$

As will be appreciated from the above description, the tasks carried out by the central processing facility 50 are not complicated and the mathematics required to determine the exact location and, moreover, the time of occurrence of the ground strokes are straightforward, thereby maximizing calculating speed and simplifying the programming required. Using available algorithms, the latitude and longitude of the stroke are then identified and these points are corrected for spherical earth error.

Advantageously, as mentioned previously, because of the precision with which the LORAN-C timing synchronization scheme operates, on the order of 0.5 microseconds, the present invention is capable of locating the exact position of lightning strokes to within 1 mile of a 50 mile radius or 2 miles of a 100 hundred mile radius from the listening stations. This degree of accuracy offers a considerable improvement over the prior art and, because of the simplification of the calculation steps required at the central processing facility and the ready availability of the LORAN-C synchronization signals, a very rapid indication of the time of occurrence and location of ground strokes can be provided for emergency early warning purposes and rapid multiple strokes within the same flash may be distinguished.

While we have shown and described one embodiment in accordance with the present invention, it is understood that the same is not limited thereto but is susceptible of numerous changes and modifications as known to a person skilled in the art, and we therefore do not wish to be limited to details shown and described herein but intend to cover all such changes and modifications as are obvious to one of ordinary skill in the art.

We claim:

1. A system for locating the position of the emission of a prescribed natural electrical disturbance comprising:

a plurality of non collinear first means defining a perimeter, respectively situated at spaced apart geographical locations, for detecting said emission and encoding the occurrence of said emission in terms of a common timing source; and second means, coupled to said first means, for deriving, from said encoded occurrences, the position of said emission irrespective of whether said emission occurred within or outside the perimeter bounded by said spaced apart geographical locations.

2. A system according to claim 1, wherein said common timing source comprises a LORAN navigation signal.

3. A system according to claim 1, wherein said plurality of first means are situated at least four spaced apart geographical locations.

4. A system according to claim 1, wherein said first means includes means for generating a local timing signal, means for synchronizing said local timing signal with said common timing source, and means for encoding the occurrence of said emission in accordance with said local timing signal.

5. A system according to claim 4, wherein said common timing source comprises a LORAN navigational signal and said synchronizing means includes means for synchronizing said local timing signal with a prescribed portion of said LORAN navigation signal.

6. A system according to claim 5, wherein said synchronizing means includes means for synchronizing said local timing signal with the master group portion of said LORAN navigation signal.

7. A system according to claim 4, wherein said first means comprises
means for generating a first signal in response to the detection of an apparent occurrence of said emission,
means for generating a second signal upon the occurrence of a prescribed characteristic of said emission subsequent to the generation of said first signal by said first signal generating means, and
means, responsive to said first and second signals, for causing the coupling of an encoded representation of the occurrence of said emission to said second means.

8. A system according to claim 1, wherein said emission of a prescribed natural electrical disturbance corresponds to a lightning stroke.

9. A system according to claim 1, wherein said emission of prescribed natural electrical disturbance corresponds to a lightning ground stroke.

10. A system according to claim 7, wherein said first signal generating means includes means for generating said first signal in response to the amplitude of a waveform representation of said emission successively exceeding preestablished threshold values within a prescribed period of time.

11. A system for locating the position of a lightning stroke comprising:
a plurality of non collinear first means defining a perimeter, respectively situated at spaced apart geographical locations, for detecting said lightning stroke and encoding the occurrence of said lightning stroke in terms of a common LORAN navigation signal; and
second means, coupled to said first means, for deriving, from said encoded occurrences, the position of said lightning stroke, irrespective of whether said lightning stroke occurred within or outside the perimeter bounded by said spaced apart geographical locations.

12. A system according to claim 11, wherein said first means includes
means for generating a local timing signal,
means for synchronizing said local timing signal with said LORAN navigation signal, and
means for encoding the occurrence of said lightning stroke emission in accordance with said local timing signal.

13. A system according to claim 12, wherein said synchronizing means includes means for synchronizing said local timing signal with the master group portion of said LORAN navigation signal.

14. For use with a system for detecting the emission of a prescribed natural electrical disturbance, and arrangement for selectively excluding an emission that has occurred beyond a prescribed range of interest comprising
first means for generating a waveform representative of the occurrence of an emission; and
second means, coupled to said first means, for generating an output signal representative of the occurrence of an emission within said range of interest in response to the amplitude of said waveform successively exceeding prescribed threshold values within a preselected period of time.

15. An arrangement according to claim 14, wherein said second means includes means for preventing the generation of said output signal in response to the amplitude of said waveform failing to successively exceed said prescribed threshold values within said preselected period of time.

16. An arrangement according to claim 14, wherein said emission of a prescribed natural electrical disturbance corresponds to a lightning stroke.

17. An arrangement according to claim 14, where said emission of a prescribed natural electrical disturbance corresponds to a lightning ground stroke.

18. A system according to claim 4, wherein said encoding means comprises means for encoding the occurrence of said emission as the time of occurrence, as established by said local timing source, of a prescribed characteristic of said emission.

19. A system according to claim 18, wherein said prescribed characteristic is a peak value of a waveform representation of said emission.

20. A system according to claim 10, wherein said second signal generating means comprises means for detecting the peak value of a waveform representation of said emission.

21. A system according to claim 7, wherein said first means includes means for encoding the occurrence of said emission as the time of occurrence of said prescribed characteristic of said emission as established by said local timing signal.

22. A system according to claim 20, wherein said encoding means comprises means for encoding the occurrence of said emission as the time of occurrence, as established by said local timing signal, of the peak value of a waveform representation of said emission.

23. A system according to claim 22, wherein said emission corresponds to a lightning ground stroke.

24. A system according to claim 11, wherein said first means comprises
means for generating a first signal in response to the detection of an apparent occurrence of said lightning stroke,
means for generating a second signal upon the occurrence of a prescribed characteristic of said lightning stroke subsequent to the generation of said first signal by said first signal generating means and
means, responsive to said first and second signals, for causing the coupling of an encoded representation of the occurrence of said lightning stroke to said second means.

25. A system according to claim 24, wherein said first signal generating means includes means for generating said first signal in response to the amplitude of a waveform representation of said lightning stroke successively exceeding preestablished threshold values within a prescribed period of time.

26. A system according to claim 25, wherein said second signal generating means comprising means for detecting the peak value of said waveform representation of said lightning stroke.

27. A system according to claim 26, wherein said encoding means comprises means for encoding the occurrence of said lightning stroke as the time of occurrence, as established by said local timing signal, of the peak value of said waveform representation of said lightning stroke.

28. A system according to claim 11, wherein said lightning stroke is a lightning ground stroke.

29. A system according to claim 12, wherein said first means comprises means for generating a first signal in response to the detection of an apparent occurrence of said lightning stroke, means for generating a second signal upon the occurrence of a prescribed characteristic of said lightning stroke subsequent to the generation of said first signal by said first signal generating means and means, responsive to said first and second signals, for causing the coupling of an encoded representation of the occurrence of said lightning stroke to said second means.

30. A system according to claim 29, wherein said first means includes means for encoding the occurrence of said lightning stroke as the time of occurrence of said prescribed characteristic of said lightning stroke as established by said local timing signal.

* * * * *

REEXAMINATION CERTIFICATE (1908th)
United States Patent [19]
Bent et al.

[11] B1 4,543,580
[45] Certificate Issued  Jan. 26, 1993

[54] SYSTEM FOR LIGHTNING GROUND STROKE POSITION BY TIME OF ARRIVAL DISCRIMINATION

[75] Inventors: Rodney B. Bent, Indialantic; Paul W. Casper, West Melbourne, both of Fla.

[73] Assignee: Atlantic Scientific Corporation, Melbourne, Fla.

Reexamination Request:
No. 90/002,625, Jan. 27, 1992

Reexamination Certificate for:
Patent No.: 4,543,580
Issued: Sep. 24, 1985
Appl. No.: 339,789
Filed: Jan. 15, 1982

[51] Int. Cl.⁵ .......................... G01S 1/44; G01S 1/24
[52] U.S. Cl. .................................. 342/460; 342/388
[58] Field of Search ............................ 342/388–391, 342/460, 465

[56] References Cited

U.S. PATENT DOCUMENTS

2,637,841  5/1953  Davis et al.
3,750,178  7/1973  Hulst.
4,115,732  9/1978  Krider et al.

OTHER PUBLICATIONS

Webster's Third New International Dictionary, Merriam–Webster, Inc. (1981) p. 747.
"Hyperbolic Direction Finding with Sferics of Transatlantic Origin" by E. A. Lewis et al., *Journal of Geophysical Research*, vol. 65, No. 7, pp. 1879–1905, Jul. 1960.
"A Hyperbolic System for Obtaining VHR Radio Pictures of Lightning" by D. E. Proctor, *Journal of Geophysical Research*, vol. 76, No. 6, pp. 1478–1489, Feb. 1971.
"Propagation of Extremely Low-Frequency (ELF) Atmospherics Over a Mixed Day-Night Path" by H. G. Hughes et al., *Journal of Atmospheric and Terrestrial Physics*, 1974, vol. 36, pp. 1648–1661.
"Lightning Source Locations From VHF Radiation Data for a Flash at Kennedy Space Center" by P. L. Rustan et al., *Journal of Geophysical Research*, vol. 85, No. C9, pp. 4893–4903, Sep. 20, 1980.
"Geometry and First-Order Error Statistics for Three- and Four-Station Hyperbolic Fixes on a Spherical Earth" by Edward A. Lewis, *Physical Sciences Research Papers*, No. 29, Jun. 1964.
"Propagation of the Ground Wave Electromagnetic Signal with Particular Reference to a Pulse of Nuclear Origin" by J. R. Johler et al., *Procedures of the IEEE*, vol. 53, No. 12, Dec. 1965.
"Precise Time and Frequency Dissemination via the Loran-C System" by Cyrus E. Potts et al., *Proceedings of the IEEE*, vol. 60, No. 5, May 1972.

*Primary Examiner*—Charles T. Jordan

[57] ABSTRACT

A lightning ground stroke location system employs a time-of-arrival discrimination scheme which uses, as its time synchronization base, the U.S. Coast Guard LORAN-C navigation network. The system comprises a plurality (at least three and preferably four) of geographically separated lightning stroke monitoring stations. Each station contains a lightning stroke detector and a timing signal generator that is synchronized with the timing signal generator at each other respective detection location. The timing signal generation equipment at each receiver is comprised of a LORAN-C signalling responsive receiver which monitors the same encoded signal group emitted from a common LORAN-C reverence source. Each of the ground stroke detection stations is further connected via a respective communication link to a central processing facility.

When a ground stroke occurs, the electromagnetic pulse emitted is detected by each listening station, which records the time of detection of the ground stroke by sampling an internal synchronized clock at that particular station so as to record the time that the stroke was detected relative to the standard timing cycle is emitted by the reference Coast Guard station source. This time data is then transmitted to the central processing station, which after compensating for relative LORAN time signal propagation delay calculates the stroke location.

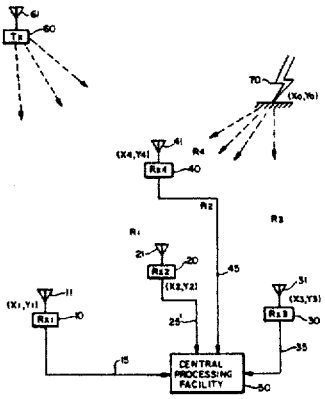

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 3 is cancelled.

Claims 1, 11 and 14 are determined to be patentable as amended.

Claims 2, 4–10, 12, 13 and 15–30, dependent on an amended claim, are determined to be patentable.

New claims 31–35 are added and determined to be patentable.

1. A system for locating the position of the emission of a prescribed natural electrical disturbance comprising:
   [a plurality of] *at least four* non collinear first means defining a perimeter, respectively situated at spaced apart geographical locations, for detecting said emission and encoding the occurrence of said emission, *at each first means, into a timing data signal representative of the time of arrival of said emission* in terms of a *single* common timing *reference* source *among the first means*; and
   second means, coupled to said first means, for deriving, from said [encoded occurrences, the] *timing data signal from at last three of said at least four non collinear first means, a true* position *fix* of said emission irrespective of whether said emission occurred within or outside the perimeter bounded by said spaced apart geographical locations.

11. A system for locating the position of a lightning stroke comprising:
   [a plurality of] *at least four* non collinear first means defining a perimeter, respectively situated at spaced apart geographical locations, for detecting said lightning stroke and encoding the occurrence of said lightning stroke, *at each first means, into a timing data signal representative of the time of arrival of said emission* in terms of a common LORAN navigation signal; and
   second means, coupled to said first means, for deriving, from said [encoded occurrences, the] *timing data signal from at least three of said at least four non collinear first means, a true* position *fix* of said lightning stroke, irrespective of whether said lightning stroke occurred within or outside the perimeter bounded by said spaced apart geographical locations.

14. For use with a system for detecting the emission of a prescribed natural electrical disturbance, [and] *an* arrangement for selectively excluding an emission that has occurred beyond a prescribed range of interest comprising:
   first means for generating a waveform representative of the occurrence of an emission; and
   second means, coupled to said first means, for generating an output signal representative of the occurrence of an emission within said range of interest in response to the amplitude of said waveform successively exceeding [prescribed threshold values] *a prescribed pre-threshold value, scaled from a prescribed main threshold value, and the main threshold value* within a preselected period of time *to discriminate long wave emissions, said main threshold value being less than a peak value of the amplitude of said waveform within the range of interest.*

*31. A system for locating the position of the emission of a prescribed natural electrical disturbance comprising:*
   *at least three non collinear first means defining a perimeter, respectively situated at spaced apart geographical locations, for detecting said emission, wherein each of said first means includes means for encoding the occurrence of said emission, at each first means, into a timing data signal representative of the time of arrival of said emission in terms of a single common timing reference source among the first means;*
   *means for transmitting said timing data signal from said first means; and*
   *second means, receiving said timing data signals from said first means via said transmitting means, for deriving, from said timing data signal from said at least three non collinear first means, the position fix of said emission irrespective of whether said emission occurred within or outside the perimeter bounded by said spaced apart geographical locations.*

*32. A system according to claim 31, wherein said single common timing reference source comprises a LORAN navigation signal.*

*33. A system according to claim 32, wherein said first means comprises:*
   *means for generating a first signal in response to the detection of an apparent occurrence of said emission,*
   *means for generating a second signal upon the occurrence of a prescribed characteristic of said emission subsequent to the generation of said first signal by said first signal generating means, and*
   *means, responsive to said first and second signals, for causing the transmission of an encoded representation of the occurrence of said emission to said second means.*

*34. A system according to claim 33, wherein said emission of a prescribed natural electrical disturbance corresponds to a lightning stroke.*

*35. A system according to claim 33, wherein said emission of a prescribed natural electrical disturbance corresponds to a lightning ground stroke.*

* * * * *